United States Patent
Cho et al.

(10) Patent No.: US 11,656,715 B2
(45) Date of Patent: May 23, 2023

(54) TOUCH CONTROLLER, TOUCH SENSING DEVICE INCLUDING THE TOUCH CONTROLLER, OPERATING METHOD OF TOUCH CONTROLLER

(71) Applicant: Samsung Electronics Co., Ltd., Suwon-si (KR)

(72) Inventors: Sungyong Cho, Hwaseong-si (KR); Jinchul Lee, Seoul (KR); Yunrae Jo, Yongin-si (KR); Bumsoo Kim, Hwaseong-si (KR); Choonghoon Lee, Seoul (KR); Yoon-Kyung Choi, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/397,223

(22) Filed: Aug. 9, 2021

(65) Prior Publication Data
US 2022/0214791 A1    Jul. 7, 2022

(30) Foreign Application Priority Data
Jan. 5, 2021    (KR) .......................... 10-2021-0001058

(51) Int. Cl.
*G06F 3/041*    (2006.01)
*G06F 3/0354*   (2013.01)
(Continued)

(52) U.S. Cl.
CPC ...... *G06F 3/04162* (2019.05); *G06F 3/03545* (2013.01); *G06F 3/0412* (2013.01);
(Continued)

(58) Field of Classification Search
CPC ............ G06F 3/04162; G06F 3/04166; G06F 3/04164; G06F 3/03545; G06F 3/0412;
(Continued)

(56) References Cited

U.S. PATENT DOCUMENTS 9,939,975 B2    4/2018   Ye et al.
10,761,619 B2   9/2020   Park
(Continued)

FOREIGN PATENT DOCUMENTS

KR          101419251 B1    7/2014
KR     10-2017-0134519 A    12/2017

*Primary Examiner* — Peter D McLoone
(74) *Attorney, Agent, or Firm* — Harness, Dickey & Pierce, P.L.C.

(57) ABSTRACT

A touch sensing device may include a touch sensor array including at least one beacon driving section and at least one compensation section, the at least one beacon driving section including a plurality of first touch electrodes, and the at least one compensation section including a plurality of second touch electrodes; and a touch controller connected to the touch sensor array through at least one first driving channel and at least one second driving channel, the touch controller is configured to, during a first uplink period for communication with an active pen, provide at least one beacon signal to the at least one first driving channel, and provide at least one compensation signal to the at least one second driving channel, the at least one compensation signal being an inverse of the at least one beacon signal.

20 Claims, 24 Drawing Sheets

(51) Int. Cl.
  *G09G 3/3225* (2016.01)
  *G06F 3/044* (2006.01)
(52) U.S. Cl.
  CPC ...... *G06F 3/04164* (2019.05); *G06F 3/04166* (2019.05); *G09G 3/3225* (2013.01); *G06F 3/0446* (2019.05); *G09G 2320/0247* (2013.01)
(58) Field of Classification Search
  CPC ................ G06F 3/0446; G09G 3/3225; G09G 2320/0247
  See application file for complete search history.

(56) References Cited

U.S. PATENT DOCUMENTS

| | | | |
|---|---|---|---|
| 2008/0158178 A1* | 7/2008 | Hotelling | G06F 3/044 345/173 |
| 2011/0298746 A1* | 12/2011 | Hotelling | G06F 3/0446 345/174 |
| 2019/0004664 A1* | 1/2019 | Zyskind | G06F 3/03545 |
| 2020/0033990 A1 | 1/2020 | Bae et al. | |
| 2020/0257429 A1 | 8/2020 | Hisano | |

* cited by examiner

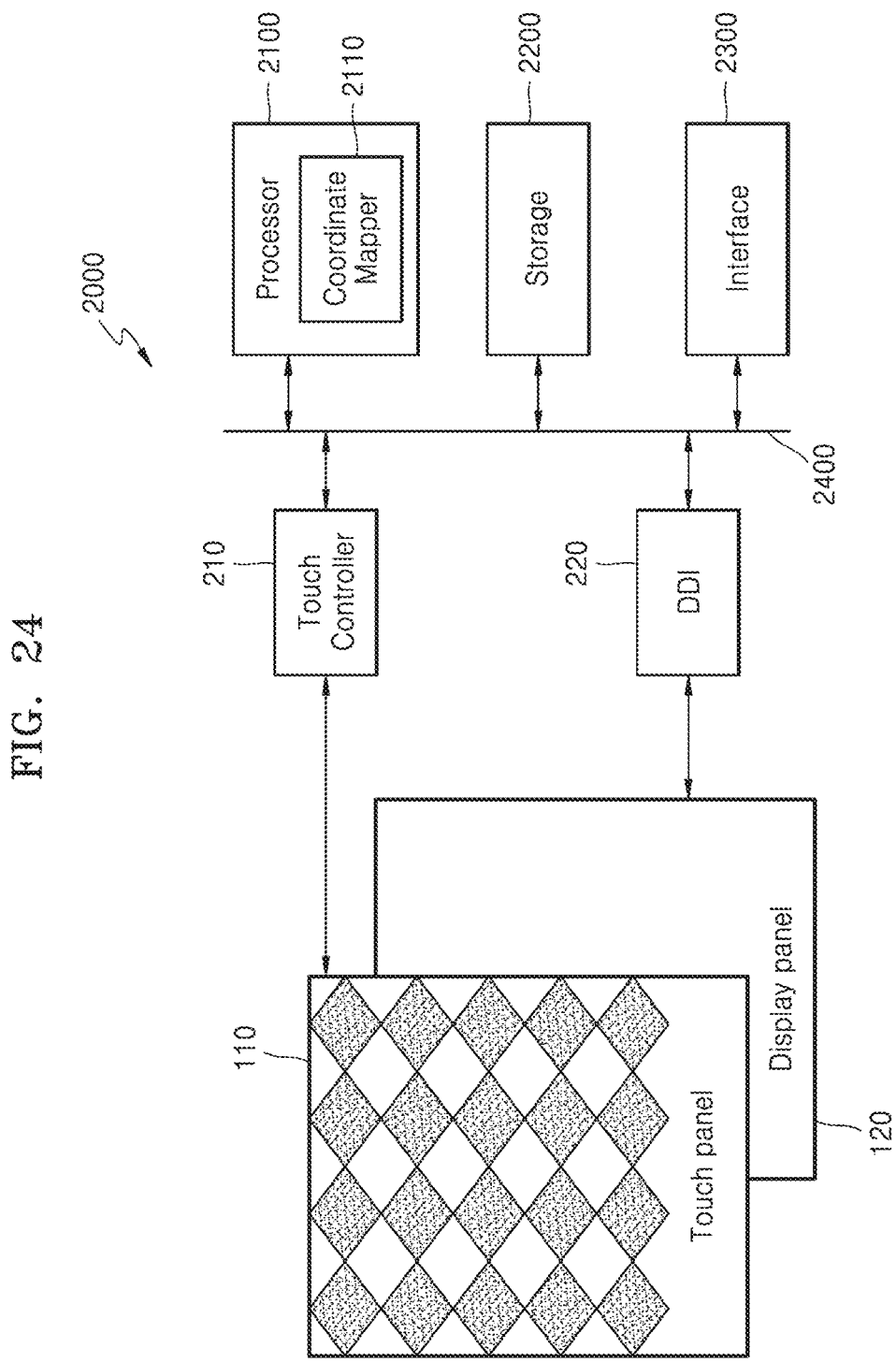

TOUCH CONTROLLER, TOUCH SENSING DEVICE INCLUDING THE TOUCH CONTROLLER, OPERATING METHOD OF TOUCH CONTROLLER

CROSS-REFERENCE TO RELATED APPLICATION

This U.S. non-provisional application is based on and claims the benefit of priority under 35 U.S.C. § 119 to Korean Patent Application No. 10-2021-0001058, filed on Jan. 5, 2021, in the Korean Intellectual Property Office, the disclosure of which is incorporated by reference herein in its entirety.

BACKGROUND

Various example embodiments of the inventive concepts relate to a touch sensing device, and more particularly, to a touch controller capable of communicating with an active pen, a touch sensing device including the touch controller, a system including the touch controller, and/or a method of operating the touch controller.

A touchscreen may include a display panel for displaying images and a touch panel for sensing a touch. The parasitic capacitance between the display panel and the touch panel may increase as the distance between the display panel and the touch panel decreases as the thickness of touchscreens become ultra-thin. The parasitic capacitance may cause observable noise, and, as a result, the image quality of an image displayed on the display panel may decrease and/or be deteriorated. In particular, in an uplink period for communication between a touchscreen device including a touchscreen and an active pen, the display panel may flicker as an uplink signal is applied to touch electrodes included in the touch panel.

SUMMARY

According to at least one example embodiment of the inventive concepts, there is provided a touch sensing device including a touch sensor array including at least one beacon driving section and at least one compensation section, the at least one beacon driving section including a plurality of first touch electrodes, and the at least one compensation section including a plurality of second touch electrodes; and a touch controller connected to the touch sensor array through at least one first driving channels and at least one second driving channels, and the touch controller is configured to, during a first uplink period for communication with an active pen, provide at least one beacon signal to the at least one first driving channel, and provide at least one compensation signal to the at least one second driving channel, the at least one compensation signal being an inverse of the at least one beacon signal.

According to at least one example embodiment of the inventive concepts, there is provided a touch controller configured to drive a touch sensor array, the touch controller including a driving circuit including a plurality of transmitters respectively connected to a plurality of driving channels, the plurality of driving channels including at least one first driving channels and at least one second driving channels that are parallel to each other; and at least one touch processor configured to control the driving circuit to provide at least one beacon signal to the at least one first driving channel and at least one compensation signal, is the at least one compensation signal being an of the at least one beacon signal, to the at least one second driving channel during a first uplink period for communication between the touch controller and an active pen, and the at least one beacon signal and the at least one compensation signal have the same amplitude.

According to at least one example embodiment of the inventive concepts, there is provided a method of operating a touch controller for driving a touchscreen, the touchscreen including a touch sensor array, the method including providing at least one beacon signal to at least one first driving channels connected to the touch sensor array during a first uplink period for communication with an active pen; during the first uplink period, providing at least one compensation signal to at least one second driving channel connected to the touch sensor array, the at least one second driving channel parallel to the at least one first driving channel, the at least one compensation signal being inverse to the at least one beacon signal; providing the at least one compensation signal to the at least one first driving channel during a second uplink period; and the at least one beacon signal and the at least one compensation signal have the same amplitude.

BRIEF DESCRIPTION OF THE DRAWINGS

Various example embodiments of the inventive concepts will be more clearly understood from the following detailed description taken in conjunction with the accompanying drawings in which:

FIG. 24 is a block diagram showing a touchscreen system according to at least one example embodiment of the inventive concepts.

DETAILED DESCRIPTION

Figure 1:
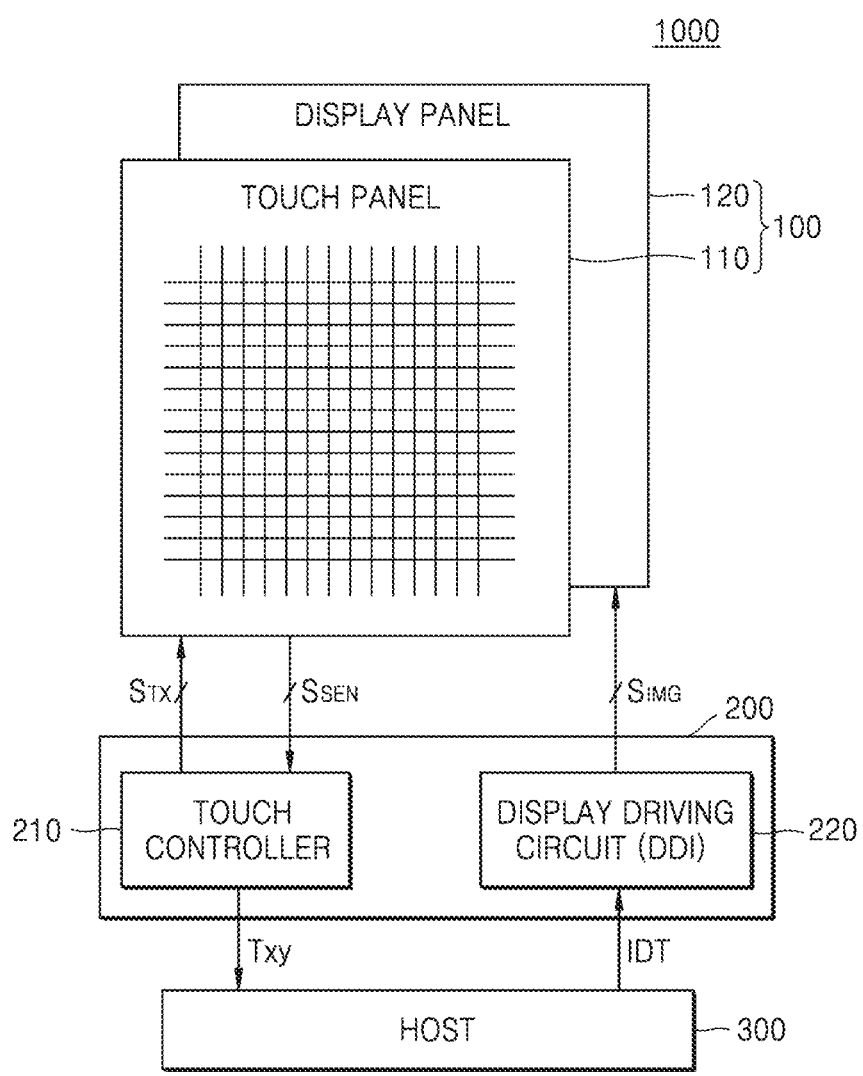
FIG. 1 is a block diagram showing a touchscreen device according to at least one example embodiment of the inventive concepts.

FIG. 1 is a block diagram showing a touchscreen device 1000 according to at least one example embodiment of the inventive concepts. The touchscreen device 1000 may be mounted on various electronic devices and may also be referred to as "touch sensing device," but is not limited thereto. For example, the touchscreen device 1000 may be mounted on an electronic device like a personal computer (PC), a laptop, a tablet, an e-reader, a personal digital assistant (PDA), a portable multimedia player (PMP), a mobile terminal, a smartphone, a wearable device, an Internet of Things (IoT) device, a refrigerator, a navigation device, a virtual reality and/or augmented reality device, etc., but the example embodiments are not limited thereto. Also, the touchscreen device 1000 may be mounted on an electronic device provided as a component for vehicles, furniture, manufacturing facilities, doors, and/or various measuring devices, etc.

Referring to FIG. 1, the touchscreen device 1000 may include a touchscreen 100 and/or a touchscreen driving circuit 200 for driving the touchscreen 100, but is not limited thereto. The touchscreen 100 may include a touch panel 110 and/or a display panel 120, etc., and may provide a touch sensing (e.g., detecting, measuring, etc.) function and a display function, etc. The touchscreen driving circuit 200 may include a touch controller 210 and/or a display driving circuit 220, etc., but is not limited thereto. Although FIG. 1 shows that the touchscreen device 1000 includes a host 300, the example embodiments of the inventive concepts are not limited thereto, and, for example, the host 300 may be implemented separately from the touchscreen device 1000, etc.

The touchscreen 100 may display an image and/or may receive a touch input of a user, etc. The touchscreen 100 may operate as an input/output device for an electronic device. In at least one example embodiment, the touchscreen 100 may further include, for example, a fingerprint sensor, and the touchscreen device 1000 may perform a fingerprint recognition function, etc.

The touch panel 110 may sense (e.g., detect and/or measure, etc.) a touch (or a touch input) on the touchscreen 100 and output sensing signals $S_{SEN}$. However, a touch is not limited to a direct contact of a conductive object (e.g., a user's finger, a user's palm, a touch pen, a stylus pen, an active pen, etc.) on the touchscreen 100 and may further include a conductive object being in proximity of the touchscreen 100, etc. The touch panel 110 may be stacked on the display panel 120 and may be attached to a front surface of the display panel 120 (e.g., a surface from which light signals are emitted). In at least one example embodiment, the touch panel 110 may cover the front surface of the display panel 120, but the example embodiments are not limited thereto.

The touch panel 110 may be implemented as a transparent and/or translucent panel having a touch-sensitive surface. Additionally, the touch panel 110 may be implemented as a touch sensor array in which transparent (and/or translucent) electrodes are patterned. In one or more of the example embodiments of the inventive concepts, the touch panel 110 may be referred to as a "touch sensor array" or a "touch sensing layer", but is not limited thereto. The touch panel 110 may include a plurality of touch electrodes arranged in rows and columns. Sensing signals $S_{SEN}$ according to one of various touch sensing methods may be output through the touch electrodes. For example, the touch electrodes may respectively output sensing signals $S_{SEN}$ according to a capacitance sensing method, etc.

In at least one example embodiment, the touch electrodes may include a plurality of driving electrodes and a plurality of receiving electrodes and/or a plurality of sensing electrodes, but the example embodiments are not limited thereto. For example, the touch panel 110 may include a plurality of driving electrodes to which a driving signal $S_{TX}$ is applied and a plurality of receiving electrodes to which a sensing signal $S_{SEN}$ is output, wherein the driving electrodes may extend in a first direction (e.g., an X-axis direction or a Y-axis direction, etc.), and the plurality of sensing electrodes may extend in a second direction (e.g., the Y-axis direction or the X-axis direction, etc.). The driving electrodes and the sensing electrodes may cross (e.g., correspond to) each other, and mutual capacitance may be formed between the driving electrodes and the sensing electrodes.

In at least one example embodiment, the touch electrodes may include a plurality of sensing electrodes. For example, the touch panel 110 may include a plurality of sensing electrodes arranged in rows and columns, and a capacitance may be capable of being formed in each of the sensing electrodes. For example, a capacitance may be formed between each sensing electrode and the ground (and/or a conductive layer in the touchscreen 100, etc.), and the capacitance may be referred to as self-capacitance, but is not limited thereto. A driving signal $S_{TX}$ may be applied to each of the sensing electrodes, and a sensing signal $S_{SEN}$ may be output from each of the sensing electrodes. In other words, each of the sensing electrodes may operate as a driving electrode and a receiving electrode, etc.

A driving signal $S_{TX}$ may be applied through a driving electrode, and a sensing signal $S_{SEN}$ representing a capacitance (e.g., mutual capacitance and/or self-capacitance) associated with a sensing electrode may be generated based on the driving signal $S_{TX}$, and the sensing signal $S_{SEN}$ may be output through a receiving electrode. When a conductive object like a human finger and/or an active pen, etc., touches an electrode and/or is close to the electrode, the capacitance corresponding to a touched electrode changes, and a sensing signal $S_{SEN}$ output from the touch panel 110 may be changed according to and/or based on the changed capacitance. For example, the level (e.g., voltage level) of the sensing signal $S_{SEN}$ may increase and/or decrease as compared to the level of the sensing signal $S_{SEN}$ before a touch occurs, etc.

The display panel 120 may include a plurality of gate lines, a plurality of source lines, and a plurality of pixels respectively arranged in rows and columns at points where the gate lines intersect with the source lines, but is not limited thereto. As such, the display panel 120 may include a "pixel array" and/or a "display layer" including the pixels. The pixels may display an image based on image signals $S_{IMG}$ received through the source lines and the gate lines. The image may be updated according to a desired and/or set frame rate, but is not limited thereto.

The display panel 120 may further include a common electrode located on the display layer. The common electrode may be between the display layer and/or a touch sensor array, but is not limited thereto. The gate lines, the source lines, and/or the pixels, etc., may be formed in the display layer. A voltage commonly provided to the pixels of the display panel 120, e.g., a ground voltage, may be applied to the common electrode.

The display panel 120 may be implemented as one of a light-emitting diode (LED) display, an organic LED (OLED) display, an active-matrix OLED (AMOLED) display, a liquid crystal display (LCD), an electrochromic display (ECD), a digital mirror device (DMD), an actuated mirror device (AMD), a grating light valve (GLV), a plasma display panel (PDP), an electro luminescent display (ELD), a vacuum fluorescent display (VFD), and other types of flat panels or flexible panels, but the example embodiments are not limited thereto.

Although FIG. 1 shows that the touch panel 110 and the display panel 120 are separate components, the example embodiments of the inventive concepts are not limited thereto. For example, the touchscreen 100 may be implemented as an in-cell type panel in which electrodes of the touch panel 110 and pixels of the display panel 120 are combined with each other and/or an on-cell type panel in which electrodes of the touch panel 110 are arranged on the display panel 120, etc., but the example embodiments are not limited thereto.

The touch controller 210 may scan (e.g., drive and sense) the touch panel 110. The touch controller 210 may provide a driving signal $S_{TX}$ to the touch panel 110 (e.g., a touch sensor array) and/or receive a sensing signal $S_{SEN}$ generated based on the driving signal $S_{TX}$ from the touch panel 110, etc. Based on the sensing signal $S_{SEN}$, the touch controller 210 may determine whether a touch input has occurred and a location information corresponding to and/or associated with where the touch input has occurred (e.g., a touch coordinate Txy), and provide the touch coordinate Txy to the host 300. In at least one example embodiment, the touch controller 210 may calculate a touch pressure (e.g., the amount of force corresponding to the touch gesture, etc.) and provide the touch pressure (e.g., touch pressure information) to the host 300 together with the touch coordinate Txy.

In at least one example embodiment, in an uplink period for communication between the touchscreen device 1000 and the active pen, the touch controller 210 may transmit a beacon signal, which is a positive phase signal (e.g., a first phase signal, etc.), to one or more first driving channels (e.g., CH1 of FIG. 8, etc.) and provide a compensation signal, which is an inverse phase signal of the beacon signal (e.g., an inverted first phase signal and/or a second phase signal, etc.), to one or more second driving channels (e.g., CH2 of FIG. 8, etc.), but the example embodiments are not limited thereto. Here, the beacon signal and the compensation signal may have the same amplitude, but are not limited thereto. In this regard, the touch controller 210 may provide a beacon signal and a compensation signal to first and second driving channels, respectively, thereby driving the touch sensor array according to and/or based on a balanced driving scheme in which noise charges introduced into a common electrode through a capacitive coupling between the touch sensor array and the common electrode are reduced and/or eliminated. More detailed descriptions of example embodiments thereof will be given later with reference to FIG. 8.

In at least one example embodiment, the first driving channels and the second driving channels may be parallel to each other, but the example embodiments are not limited thereto. In at least one example embodiment, the touch panel 110 may include a touch sensor array, and the touch sensor array may include at least one beacon driving section including first touch electrodes (e.g., a plurality of first touch electrodes, etc.) to which a beacon signal is applied and at least one compensation section including second touch electrodes (e.g., a plurality of second touch electrodes, etc.) to which a compensation signal is applied. For example, a plurality of rows in the touch sensor array may be divided into at least one beacon driving section and at least one compensation section, but is not limited thereto. More detailed descriptions of example embodiments thereof will be given later with reference to FIG. 12. For example, a plurality of columns in the touch sensor array may be divided into at least one beacon driving section and at least one compensation section, but is not limited thereto. More detailed descriptions of example embodiments thereof will be given later with reference to FIG. 13.

In at least one example embodiment, the at least one compensation section may include at least one first compensation section and a second compensation section apart from each other, and the at least one beacon driving section may be between the first compensation section and the second compensation section, but the example embodiments are not limited thereto, and for example, may include more than two compensation sections, etc. More detailed descriptions of the example embodiments thereof will be given later with reference to FIG. 10. In at least one example embodiment, the at least one compensation section may include at least a first compensation section and a second compensation section apart from each other, the at least one beacon driving section may include at least a first beacon driving section and a second beacon driving section apart from each other, and the first compensation section may be between the first beacon driving section and the second beacon driving section, etc., but the example embodiments are not limited thereto. More detailed descriptions of the example embodiments thereof will be given later with reference to FIG. 14.

The display driving circuit 220 may receive image data IDT from the host 300 (e.g., an external host, etc.) and drive the display panel 120 to display an image on the display panel 120 according to and/or based on the image data IDT, etc., but is not limited thereto. The display driving circuit 220 may convert the image data IDT into image signals $S_{IMG}$, which are analog signals, and respectively provide the image signals $S_{IMG}$ to corresponding pixels of the display panel 120. The touch controller 210 and/or the display driving circuit 220 may transmit and/or receive a synchronization signal and/or status information, etc., but the example embodiments are not limited thereto.

The host 300 may perform an overall control operation for the touchscreen device 1000. The host 300 may generate data related to a display operation, provide the data to the display driving circuit 220, receive information indicating whether a touch has occurred, a touch coordinate Txy, and/or a touch pressure (e.g., intensity), etc., from the touch controller 210, and/or perform at least one control operation based on the touch coordinate Txy and/or the touch pressure (e.g., intensity), etc.

In at least one example embodiment, the host 300 may include an application processor (AP), and the application processor may be implemented as a system-on-chip (SoC), but the example embodiments are not limited thereto. The SoC may include a system bus (not shown) to which a desired and/or predetermined standard bus protocol is applied and may include various intellectual property (IP) blocks connected to the system bus. As a standard protocol for the system bus, various types of protocols like the advanced microcontroller bus architecture (AMBA) protocol of Advanced RISC Machine (ARM) may be applied, etc., but the example embodiments are not limited thereto.

Figure 2:
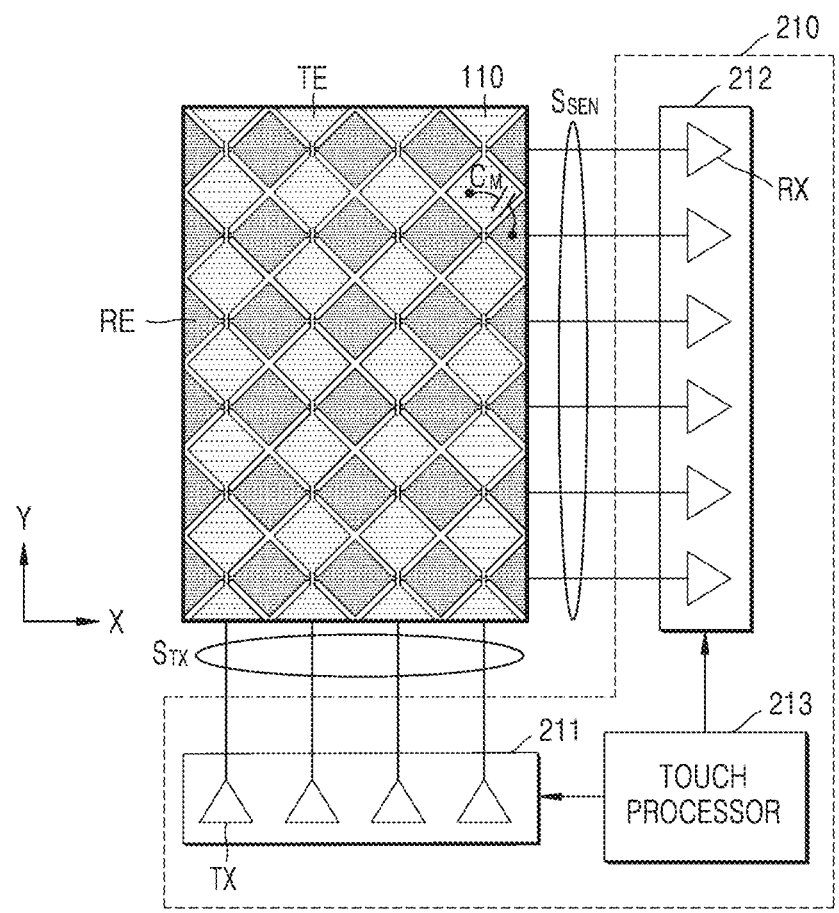
FIG. 2 is a diagram showing a touch panel and a touch controller of FIG. 1 in more detail according to at least one example embodiment of the inventive concepts.

FIG. 2 is a diagram showing the touch panel 110 and the touch controller 210 of FIG. 1 in more detail according to at least one example embodiment of the inventive concepts.

Referring to FIG. 2, the touch panel 110 and the touch controller 210, etc., may constitute a touch sensing device, but the example embodiments are not limited thereto. The touch panel 110 may include a plurality of driving electrodes TE and a plurality of receiving electrodes RE, which may be referred to as a plurality of touch electrodes, a plurality of sensing electrodes, or a plurality of sensing units. In at least one example embodiment, the receiving electrodes RE may extend in a first direction, e.g., an X-axis direction, and the driving electrodes TE may extend in a second direction, e.g., a Y-axis direction, but are not limited thereto. The first direction and the second direction are directions orthogonal to each other, and the receiving electrodes RE and the driving electrodes TE may intersect each other. Mutual capacitance $C_M$ may be formed between a driving electrode TE and a receiving electrode RE. To improve touch sensing characteristics (e.g., touch sensing sensitivity), a unit electrode of a plurality of touch electrodes (e.g., the driving electrodes TE and/or the receiving electrodes RE) may have a particular shape (e.g., a rhombus-like shape as shown in FIG. 2) or a pattern, but the example embodiments of the inventive concepts are not limited thereto.

The touch controller 210 may include a driving circuit 211, a receiving circuit 212, and/or a touch processor 213, etc. According to at least one example embodiment, the driving circuit 211, the receiving circuit 212, and/or the touch processor 213, etc., may be processing circuitry, and the processing circuitry may include hardware, such as processors, processor cores, logic circuits, storage devices, etc.; a hardware/software combination such as at least one processor core executing software and/or executing any instruction set, etc.; or a combination thereof, but the example embodiments are not limited thereto. For example, the processing circuitry more specifically may include, but is not limited to, a field programmable gate array (FPGA), a programmable logic unit, an application-specific integrated circuit (ASIC), s System-on-Chip (SoC), etc. The driving circuit 211 may include a plurality of transmitters TX, and the transmitters TX may provide a driving signal $S_{TX}$ to the driving electrodes TE. According to some example embodiments, the driving circuit 211 may further include an encoder, and the encoder may be implemented separately from the driving circuit 211, but is not limited thereto. The receiving circuit 212 may include a plurality of receivers RX, and the receivers RX may receive a sensing signal $S_{SEN}$ from the receiving electrodes RE. According to some example embodiments, the receiving circuit 212 may further include a decoder, and the decoder may be implemented separately from the receiving circuit 212, but is not limited thereto.

In at least one example embodiment, in an uplink period for communication between the touch controller 210 and the active pen, the driving signal $S_{TX}$ may include a beacon signal and/or a compensation signal, etc., and the transmitters TX may provide a beacon signal and/or a compensation signal to the driving electrodes TE, etc. For example, from among a plurality of transmitters TX, the number of transmitters TX providing a beacon signal may be the same and/or substantially the same as the number of transmitters TX providing a compensation signal, but the example embodiments of the inventive concepts are not limited thereto.

The sensing signal $S_{SEN}$ may represent the mutual capacitance $C_M$ (e.g., mutual capacitance value) between the driving electrode TE to which the driving signal $S_{TX}$ is applied and the receiving electrode RE by which the sensing signal $S_{SEN}$ is received. For example, when a touch occurs at a point on the touch panel 110, the mutual capacitance $C_M$ at the point may decrease, and the level of the sensing signal $S_{SEN}$ may decrease or increase as compared to the level of the sensing signal $S_{SEN}$ before the touch occurred. The receivers RX may generate a plurality of sensed values by amplifying and analog-digital converting a received sensing signal $S_{SEN}$.

In at least one example embodiment, the touch panel 110 may include a plurality of sensing electrodes each operating as a driving electrode and a sensing electrode. The sensing electrodes may be arranged in rows and columns, and each of the sensing electrodes may be referred to as a "dot sensor". To provide a driving signal to each of the dot sensors and to receive a sensing signal, a transmitter and a receiver may be implemented as a single component. More detailed descriptions of example embodiments thereof will be given later with reference to FIG. 21.

The touch processor 213 may control the overall operation of the touch controller 210 and, for example, may control operation timings of the driving circuit 211 and/or the receiving circuit 212, etc. Also, the touch processor 214 may determine whether a touch has occurred, a location of a touch, and/or a touch intensity (e.g., pressure information, etc.), etc., based on a plurality of sensed values and/or a plurality of touch values received from the receiving circuit 212, but is not limited thereto.

Figure 3:
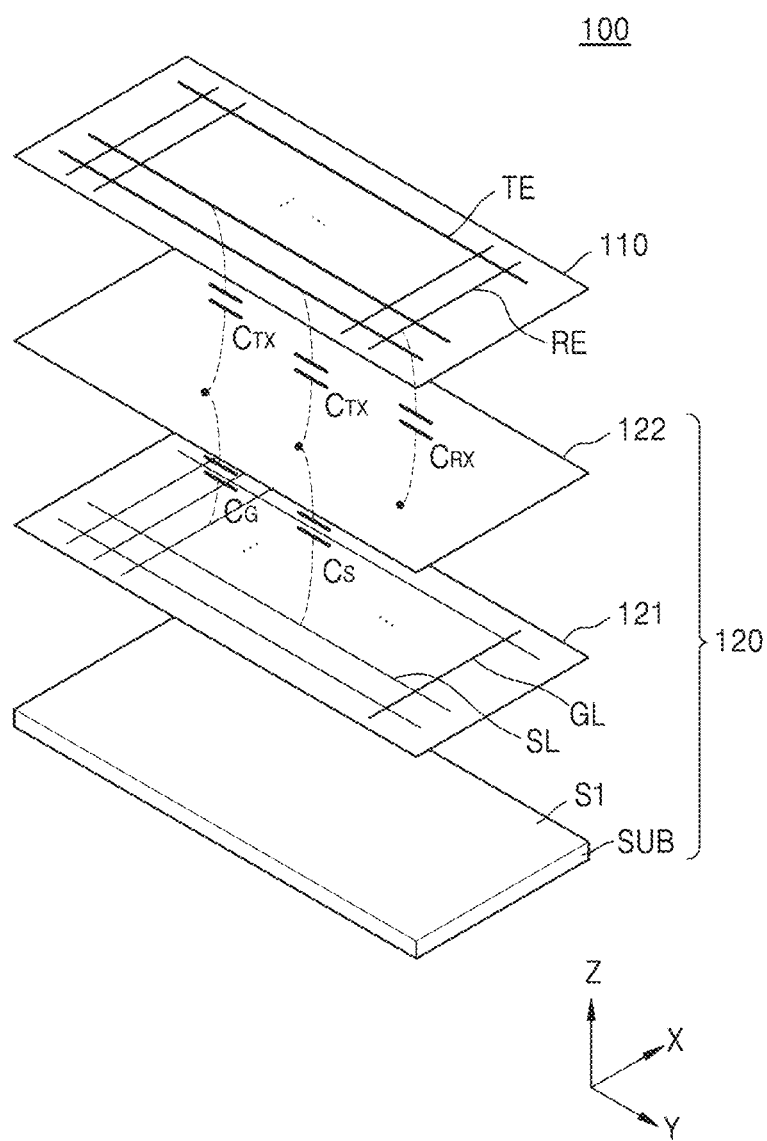
FIG. 3 is a diagram showing a touchscreen of FIG. 1 according to at least one example embodiment of the inventive concepts in more detail.

FIG. 3 is a diagram showing the touchscreen 100 of FIG. 1 according to at least one example embodiment of the inventive concepts in more detail.

Referring to FIG. 3, the touchscreen 100 may include a substrate SUB, a display layer 121, a common electrode 122, and/or the touch panel 110 (or "touch sensor array"), etc., but is not limited thereto, and for example, may include a greater or lesser number of constituent elements, etc. However, the example embodiments of the inventive concepts are not limited thereto, and the touchscreen 100 may further include, for example, other layers between the above-stated components, etc. Also, for example, the touchscreen 100 may further include a top glass on the touch panel 110, etc.

The substrate SUB may include a first surface S1 extending in a first direction, e.g., an X-axis direction, and a second direction, e.g., a Y-axis direction. The display layer 121, the common electrode 122, and/or the touch panel 110, etc., may be stacked in a direction perpendicular to the first surface S1 of the substrate SUB, e.g., a Z-axis direction. As shown in FIG. 3, the common electrode 122 may be between the display layer 121 and the touch panel 110, but is not limited thereto. Parasitic capacitances (e.g., $C_{TX}$ and $C_{RX}$) may be formed between a plurality of electrodes of the touch panel 110, e.g., the driving electrode TE, the receiving electrode RE, and the common electrode 122, and parasitic capacitances (e.g., $C_S$ and $C_G$) may be formed between a source line SL and a gate line GL of the common electrode 122 and the display layer 121, etc.

Figure 4:
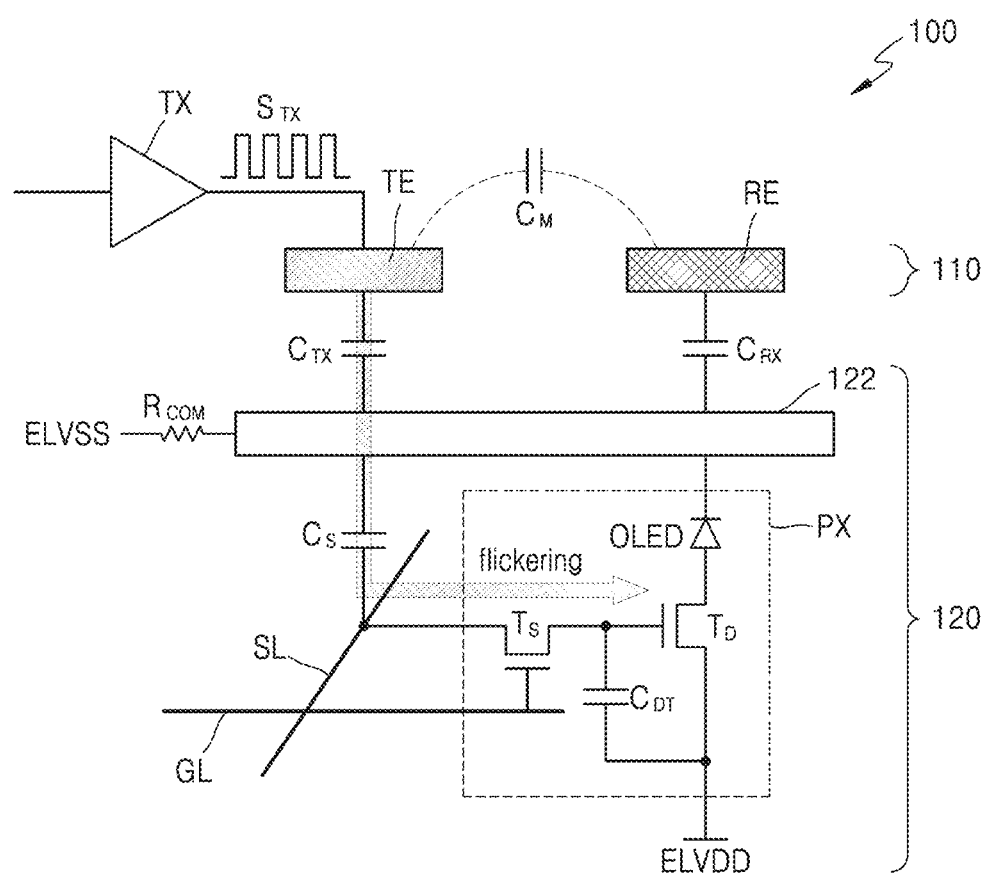
FIG. 4 is a circuit diagram showing the touchscreen of FIG. 1 according to at least one example embodiment of the inventive concepts.

FIG. 4 is a circuit diagram showing the touchscreen 100 of FIG. 1 according to at least one example embodiment of the inventive concepts.

Referring to FIGS. 2 to 4 together, mutual capacitance $C_M$ may be formed between the driving electrode TE and the receiving electrode RE of the touch panel 110, but the example embodiments are not limited thereto. The parasitic capacitances $C_{TX}$ and $C_{RX}$ may be formed between the common electrode 122, the driving electrode TE, and the receiving electrode RE, etc., of the display panel 120. A parasitic capacitance $C_S$ may be formed between the common electrode 122 and the source line SL, but is not limited thereto.

A pixel PX may include a selecting transistor $T_S$, a driving transistor $T_D$, a data capacitor $C_{DT}$, and/or an organic light-emitting diode (OLED), etc., but the example embodiments are not limited thereto. A first end of the selecting transistor $T_S$ may be connected to the source line SL, and a second end of the selecting transistor $T_S$ may be connected to a gate terminal of the driving transistor $T_D$. The gate terminal of the selecting transistor $T_S$ may be connected to the gate line GL. A first power voltage ELVDD may be applied to a first end of the driving transistor $T_D$, and a second end of the driving transistor $T_D$ may be connected to an anode of the OLED. The data capacitor $C_{DT}$ may be connected to the first end and a gate terminal of the driving transistor $T_D$.

A cathode of the OLED may be connected to the common electrode 122, and a second power voltage ELVSS may be applied to the common electrode 122. In some example embodiments, the common electrode 122 may also be referred to as a "cathode". The voltage level of the second power voltage ELVSS is lower than that of the first power voltage ELVDD. For example, the second power voltage ELVSS may be a ground voltage. The common electrode 122 may include a resistance component, e.g., a parasitic resistance $R_{COM}$, but is not limited thereto.

In at least one example embodiment, a thin film encapsulation (TFE) may be provided between the touch panel 110 and the common electrode 122, etc. At this time, the TFE may be implemented as an ultra-thin thin film having a thickness less than 10 μm, for example, but is not limited thereto. Therefore, the parasitic capacitances $C_{TX}$ and $C_{RX}$ between the driving electrode TE, the receiving electrode RE, and the common electrode 122 of the touch panel 110 may be very large. Also, in a situation in which the voltage of the driving signal $S_{TX}$ applied to the driving electrode TE varies, noise charges may flow into the common electrode 122.

In this regard, in a situation in which the voltage of the driving signal $S_{TX}$ varies, noise charges may cause fluctuation of the second power voltage ELVSS through parasitic capacitances. The output luminance of the OLED may fluctuate due to the fluctuation of the second power voltage ELVSS, and thus, a flicker phenomenon may occur which causes the OLED to flicker and/or screen shake which may be observed and/or recognized by a user.

In addition, when noise charges flowing into the common electrode 122 are applied to the pixel PX, the threshold voltage of the driving transistor $T_D$ may be distorted and/or a current flowing through the OLED may shift to an undesired level. In this case, the output luminance of the OLED may fluctuate, and thus, a flicker phenomenon causing flicker and/or screen shake that may be recognized by a user may occur.

Figure 5:
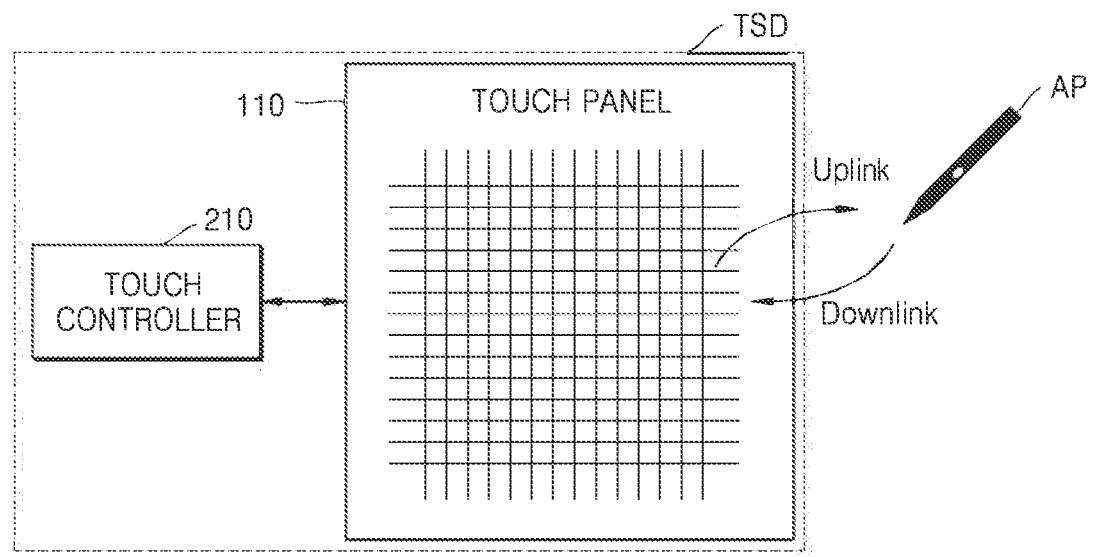
FIG. 5 is a conceptual diagram showing communication between a touch sensing device and an active pen according to at least one example embodiment of the inventive concepts.

FIG. 5 is a conceptual diagram showing communication between a touch sensing device TSD and an active pen AP according to at least one example embodiment of the inventive concepts.

Referring to FIG. 5, the touch sensing device TSD may communicate bidirectionally with the active pen AP. Unlike a common stylus pen which only provides a touch to the touch sensing device $T_D$ (e.g., unidirectional communication), the active pen AP may receive information from the touch sensing device $T_D$ and/or provide information other than a touch to the touch sensing device $T_D$, etc. To this end, the active pen AP may include various components, e.g., an input button, a transceiver, a logic circuit (e.g., processing circuitry, etc.), and/or a memory, but the example embodiments are not limited thereto.

A signal provided from the touch sensing device TSD to the active pen AP may be referred to as an "uplink signal," and a period in which an uplink signal is provided from the touch sensing device TSD may be referred to as an "uplink period." A signal provided from the active pen AP to the touch sensing device TSD may be referred to as a "downlink signal," and a period in which a downlink signal is provided from the active pen AP may be referred to as a "downlink period."

The touch sensing device TSD may include the touch panel 110 and/or the touch controller 210, etc. The touch controller 210 generates an uplink signal for communication with the active pen AP, and a generated uplink signal may be transmitted to the active pen AP through a capacitive coupling via a plurality of touch sensors arranged on the touch panel 110, but is not limited thereto. Also, the active pen AP generates a downlink signal for communication with the touch controller 210, and a generated downlink signal may be transmitted to the touch controller 210 through a capacitive coupling via the touch sensors arranged on the touch panel 110, etc.

Figure 6:
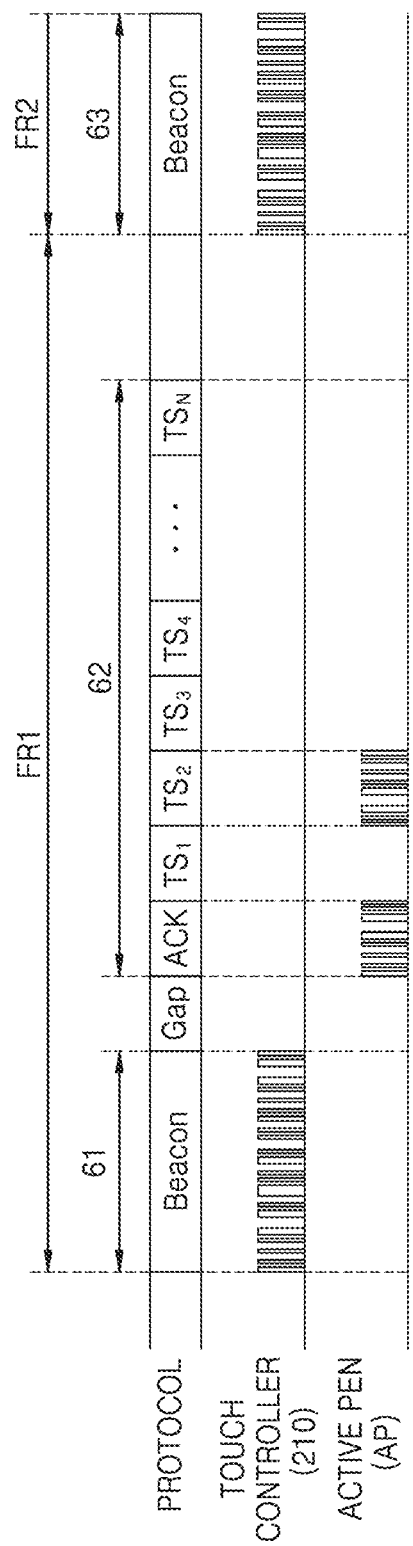
FIG. 6 is a timing diagram showing communication between the touch sensing device and the active pen according to at least one example embodiment of the inventive concepts.

FIG. 6 is a timing diagram showing communication between the touch sensing device TSD and the active pen AP according to at least one example embodiment of the inventive concepts. In detail, the timing diagram of FIG. 6 shows communication based on a universal stylus initiative (USI) pen protocol as an example of the protocol for the active pen AP. According to some example embodiments, the touch sensing device TSD and the active pen AP may be collectively referred to as a "USI system". Hereinafter, example embodiments of the inventive concepts will be described with reference mainly to the USI pen protocol, but the example embodiments are not limited thereto, and for example, other example embodiments of the inventive concepts may also be applied to other protocols, e.g., the Microsoft pen protocol (MPP), etc.

Referring to FIGS. 5 and 6 together, the touch controller 210 and the active pen AP may communicate frame-by-frame and/or packet-by-packet, and a first frame FR1 may include an uplink period 61 and a downlink period 62, but is not limited thereto, and for example, the frame may include only an uplink period, only a downlink period, and/or a plurality of uplink periods and/or downlink periods, etc. Also, a second frame FR2 after the first frame FR1 may include an uplink period 63. Although not shown, the second frame FR2 may further include a downlink period after the uplink period 63. In this regard, communication between the touch controller 210 and the active pen AP may include a plurality of frames, and each frame may include an uplink period and/or a downlink period, etc., but is not limited thereto.

In the uplink period 61, the touch controller 210 may transmit at least one beacon signal to the active pen AP as an uplink signal, and the beacon signal may include various information, e.g., a downlink frequency, active pen configuration information, etc. After at least one beacon signal is received normally (e.g., successfully), the active pen AP may transmit an ACK signal to the touch sensing device TSD in the downlink period 62 and may extract information from the beacon signal, etc.

Also, in the downlink period 62, the active pen AP may transmit a downlink signal to the touch sensing device TSD based on the extracted information. In this regard, after the ACK signal is received from the active pen AP, the touch sensing device TSD may receive a downlink signal from the active pen AP. For example, the downlink period 62 may include N time slots $TS_1$ to $TS_N$.

Figure 7:
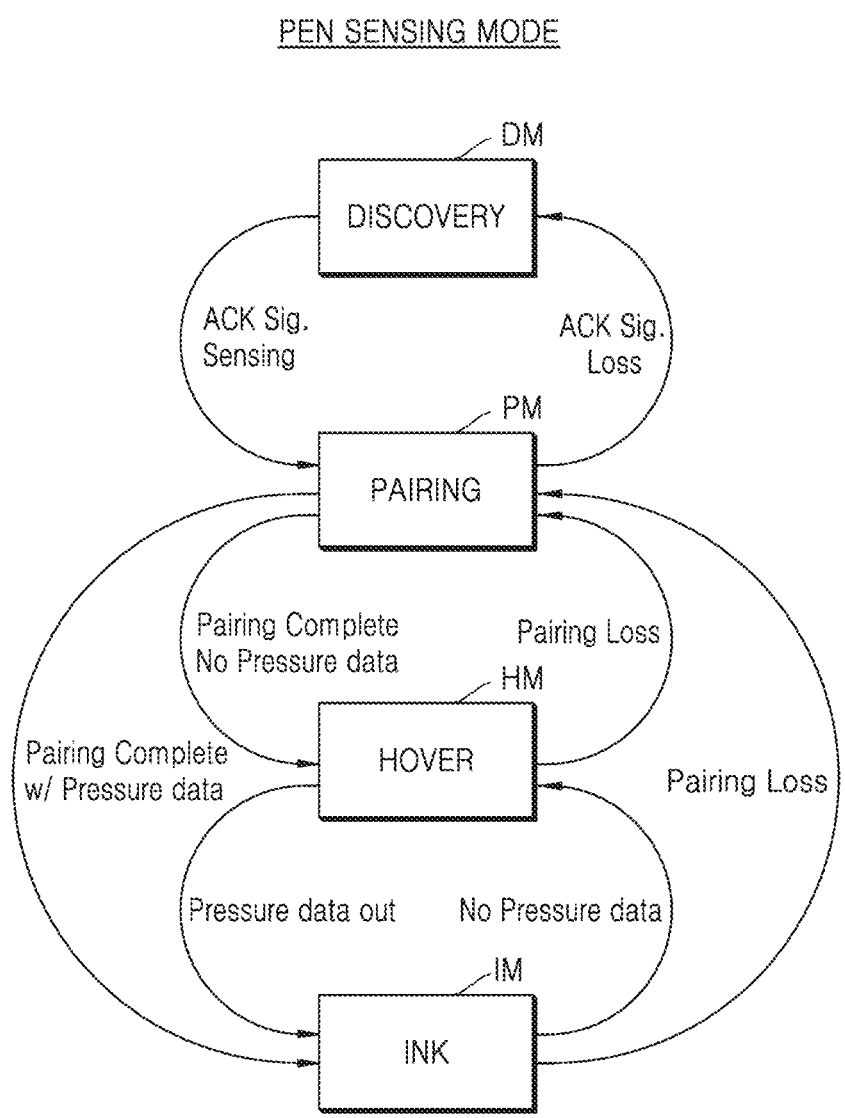
FIG. 7 is a flowchart showing a pen sensing mode of a touch sensing device according to at least one example embodiment of the inventive concepts.

FIG. 7 is a flowchart showing a pen sensing mode of the touch sensing device TSD according to at least one example embodiment of the inventive concepts.

Referring to FIGS. 5 to 7 together, it may be defined that the pen sensing mode includes a discovery state and/or a discovery mode DM, a pairing state and/or a pairing mode PM, a hover state and/or a hover mode HM, and an ink state and/or an ink mode IM, etc., but the example embodiments are not limited thereto. The discovery mode DM is defined as a state in which the touch controller 210 transmits a beacon signal to check whether the active pen AP (and/or any active pen AP) is in proximity of the display device (e.g., within a desired distance of the display device). While in the discovery mode DM, the touch controller 210 may receive only an ACK signal from the active pen AP. When the touch controller 210 senses an ACK signal in the discovery mode DM, the touch sensing device TSD enters the pairing mode PM. In the pairing mode PM, the touch controller 210 may receive only an ACK signal from the active pen AP. When an ACK signal is maintained for a desired period and/or completion of the pairing process, e.g., up to 8 frames in the pairing mode PM, but not limited thereto, it is defined as a state in which pairing is completed.

After pairing is completed, the touch sensing device TSD is switched to the ink mode IM and/or the hover mode HM depending on whether pressure data is received. When the touch controller 210 receives pressure data, it is switched from the pairing mode PM to the ink mode IM. When the touch controller 210 does not receive pressure data, it is switched from the pairing mode PM to the hover mode HM. In the ink mode IM and the hover mode HM, the touch controller 210 and the active pen AP may communicate in the order of a beacon signal, an ACK signal, a location signal, and/or a data packet, but is not limited thereto.

The discovery mode DM, the pairing mode PM, the hover mode HM, and the ink mode IM all include the uplink period 61, and thus, the touch controller 210 may generate an uplink signal, e.g., a beacon signal, in all of the discovery mode DM, the pairing mode PM, the hover mode HM, and/or the ink mode IM, but is not limited thereto. In this regard, the touch controller 210 may transmit at least one beacon signal to a plurality of touch electrodes arranged on the touch panel 110, e.g., driving electrodes, for communication with the active pen AP.

Figure 8:
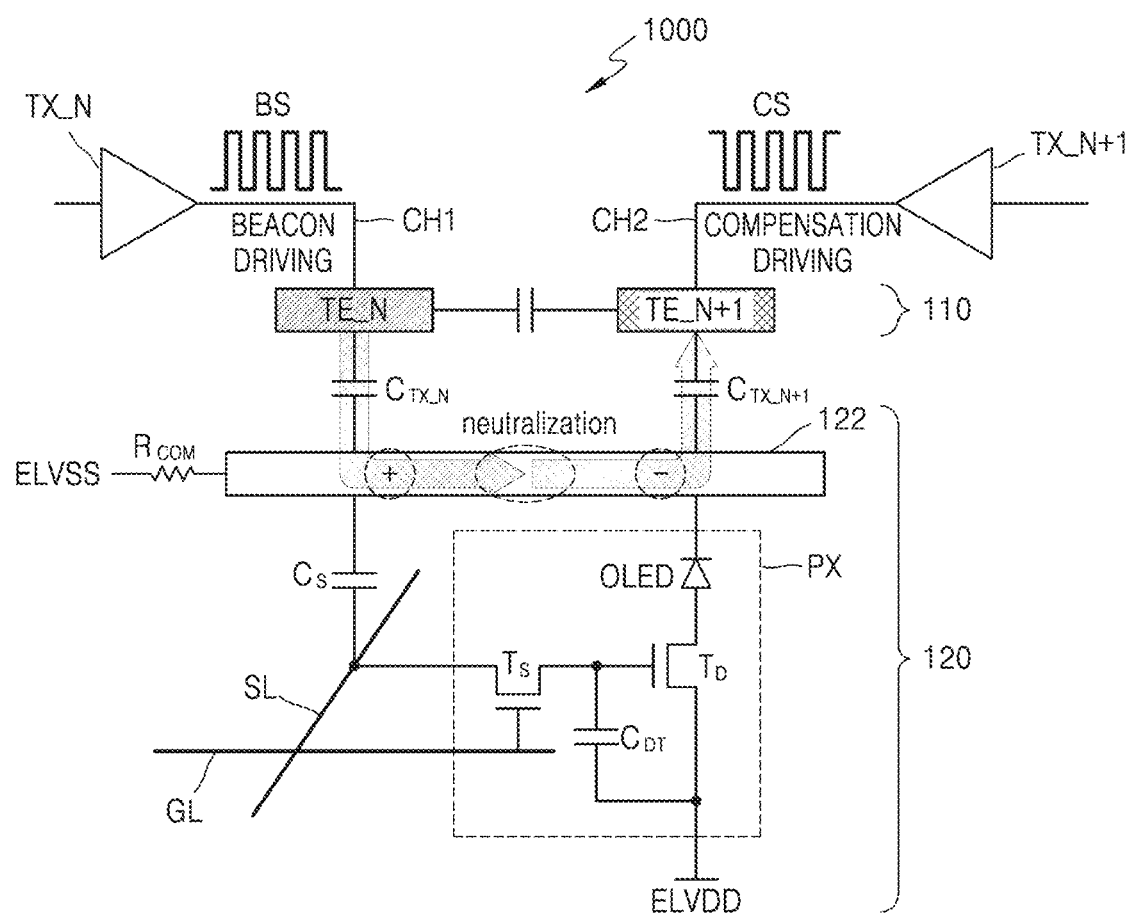
FIG. 8 is a diagram showing a driving operation of the touch sensing device according to at least one example embodiment of the inventive concepts.

FIG. 8 is a diagram showing a driving operation of the touchscreen device 1000 according to at least one example embodiment of the inventive concepts.

Referring to FIG. 8, the touchscreen device 1000 may include the touch panel 110, the display panel 120, a first transmitter TX_N, and/or a second transmitter TX_N+1, etc., but the example embodiments are not limited thereto, and for example, may have a greater or lesser number of constituent elements. The touch panel 110 may include a touch sensor array including a plurality of touch electrodes, e.g., a first touch electrode TEN and a second touch electrode TE_N+1, etc. According to some example embodiments, the touch panel 110 may further include a plurality of transmitters, such as the first transmitter TX_N and the second transmitter TX_N+1, etc., which may correspond to, for example, the transmitters TX included in the driving circuit 211 of FIG. 2, but the example embodiments are not limited thereto. The descriptions given above with reference to FIGS. 2 and 4 may also be applied to the at least one example embodiment of FIG. 8, and descriptions identical to those will be omitted, but the example embodiments are not limited thereto.

The first transmitter TX_N may provide at least one beacon signal BS to the first touch electrode TE_N through a first driving channel CH1, and the second transmitter TX_N+1 may provide a compensation signal CS to the second touch electrode TE_N+1 through a second driving channel CH2. In this regard, the first transmitter TX+N and the second transmitter TX_N+1 may provide the beacon signal BS and/or the compensation signal CS as driving signals, respectively. As an example, the beacon signal BS is a positive phase signal and the compensation signal CS is an inverse phase signal of the beacon signal BS, wherein the beacon signal BS and the compensation signal CS may have the same amplitude, but the example embodiments are not limited thereto. Therefore, the first transmitter TX_N may beacon-drive the first touch electrode TE_N, and the first driving channel CH1 may be referred to as a "beacon-driving positive channel." Also, the second transmitter TX_N+1 may compensation-drive the second touch electrode TE_N+1, and the second driving channel CH2 may be referred to as a "compensation-driving negative channel."

In at least one uplink period for communication between the touchscreen device 1000 and the active pen AP, the first transmitter TX_N and the second transmitter TX_N+1 may provide the beacon signal BS and/or the compensation signal CS to the first touch electrode TE_N and/or the second touch electrode TE_N+1 through the first driving channel CH1 and the second driving channel CH2, respectively, etc. Therefore, during a first time period, an amount of noise charges applied to the common electrode 122 from the first touch electrode TE_N through a parasitic capacitance $C_{TX\_N}$ between the first touch electrode TE_N and the common electrode 122 may be and/or may become identical and/or substantially identical to an amount of noise charges leaked from the common electrode 122 to the second touch electrode TE_N+1 through a parasitic capacitance $C_{TX\_N+1}$ between the second touch electrode TE_N+1 and the common electrode 122. Also, during a second time period after the first time period, an amount of noise charges leaked from the common electrode 122 to the first touch electrode TE_N through the parasitic capacitance $C_{TX\_N}$ between the first touch electrode TE_N and the common electrode 122 may be and/or may become identical and/or substantially identical to an amount of noise charges applied to the common electrode 122 from the second touch electrode TE_N+1 through the parasitic capacitance $C_{TX\_N+1}$ between the second touch electrode TE_N+1 and the common electrode 122.

In this regard, by respectively providing the beacon signal BS and the compensation signal CS having the same amplitude but opposite phases to the first touch electrode TE_N and the second touch electrode TE_N+1, noise charges may be removed from the common electrode 122 through a neutralization of the noise charges. In other words, in the common electrode 122, noise due to the beacon signal BS and noise due to the compensation signal CS may be offset. Therefore, in an uplink period, because the noise charges introduced into the common electrode 122 may be reduced, prevented, and/or suppressed from being applied to the pixel PX, a flicker phenomenon may be prevented and/or reduced.

Figure 9:
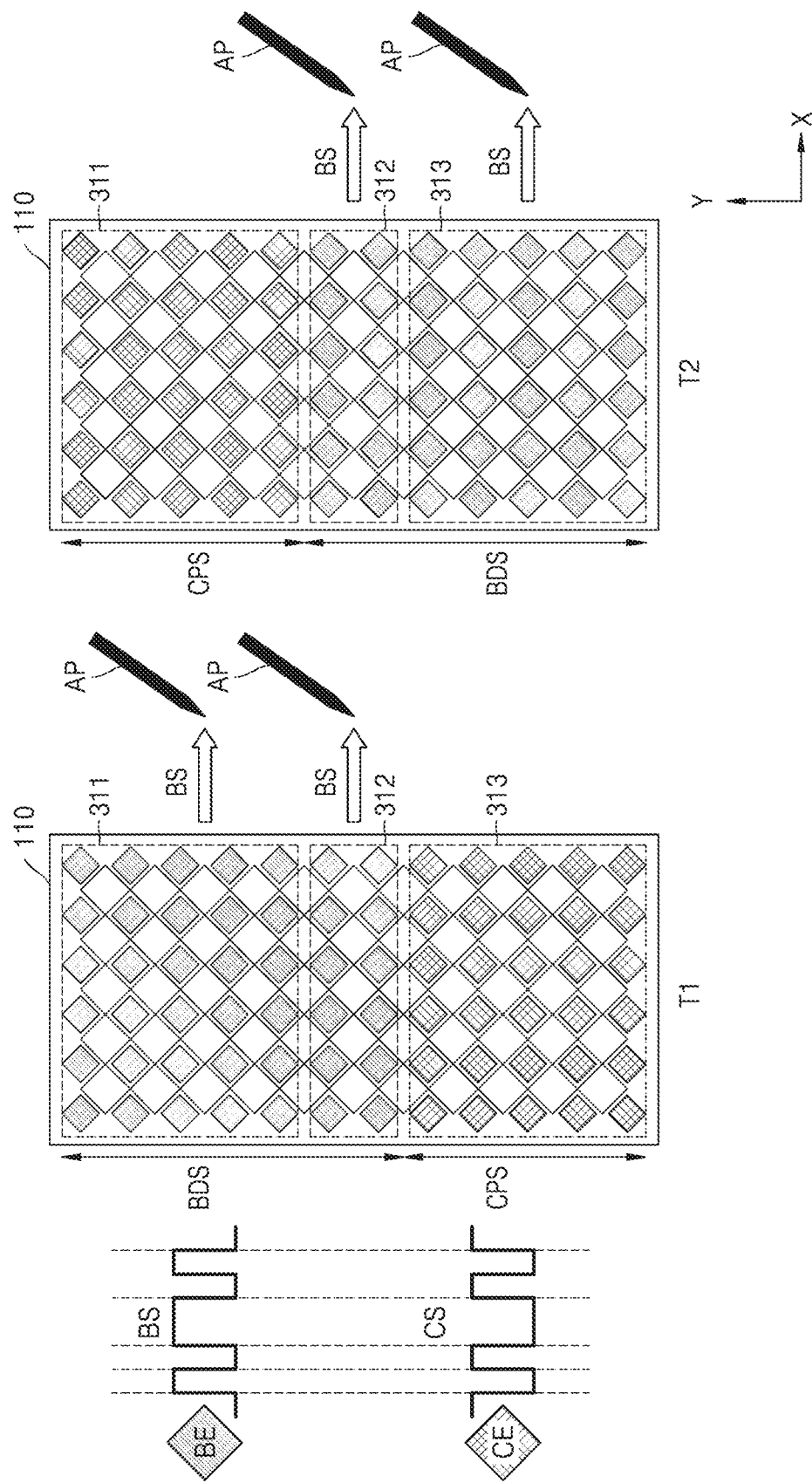
FIGS. 9 to 14 are diagrams showing a method of driving a touch panel in a discovery mode according to some embodiment of the inventive concepts.

FIG. 9 is a diagram showing a method of driving the touch panel 110 in a discovery mode according to at least one example embodiment of the inventive concepts.

Referring to FIG. 9, the touch panel 110 may include a touch sensor array including a plurality of rows and a plurality of columns, but is not limited thereto. Each row may include a plurality of touch electrodes arranged in a first direction (e.g., an X direction), and each column may include a plurality of touch electrodes arranged in a second direction (e.g., a Y direction), etc. For example, the rows may each receive driving signals through a plurality of driving channels, respectively, and the driving signals may include a beacon signal BS and/or a compensation signal CS, etc.

In at least one example embodiment, the touch sensor array may be divided into a plurality of sections, such as a first to third sections 311, 312, and 313, etc., but the example embodiments are not limited thereto. For example, the rows included in the touch panel 110 may be divided into, e.g., first to third sections 311, 312, and 313, etc. In a first uplink period T1, a beacon signal BS may be transmitted to the active pen AP through the touch panel 110. In a second uplink period T2 after the first uplink period T1, a beacon signal BS may be transmitted to the active pen AP through the touch panel 110.

In the first uplink period T1, the first section 311 and the second section 312 may correspond to a beacon driving section BDS, and the third section 313 may correspond to a compensation section CPS, but the example embodiments are not limited thereto. The one or more sections, e.g., the first section 311 and the second section 312, etc., corresponding to the beacon driving section BDS may include a plurality of touch electrodes to which the beacon signal BS is applied, e.g., beacon driving electrodes BE. The section, e.g., the third section 313, etc., corresponding to the compensation section CPS may include a plurality of touch electrodes to which the compensation signal CS is applied, e.g., compensation driving electrodes CE. For example, in the first uplink period T1, a plurality of touch electrodes arranged in the second direction (e.g., the Y direction) may be floated, but the example embodiments of the inventive concepts are not limited thereto.

In the second uplink period T2, as an example, the first section 311 may correspond to the compensation section CPS, and the second section 312 and the third section 313 may correspond to the beacon driving section BDS, but the example embodiments are not limited thereto. The second section 312 and the third section 313 corresponding to the beacon driving section BDS may include a plurality of touch electrodes to which the beacon signal BS is applied, e.g., beacon driving electrodes BE. The first section 311 corresponding to the compensation section CPS may include a plurality of touch electrodes to which the compensation signal CS is applied, e.g., compensation driving electrodes CE. For example, in the second uplink period T2, a plurality of touch electrodes arranged in the second direction (e.g., the Y direction) may be floated, but the example embodiments of the inventive concepts are not limited thereto.

According to at least one example embodiment, in the case of the second section 312 between the first section 311 and the third section 313, the beacon signal BS may be applied to the touch electrodes in both the first uplink period T1 and the second uplink period T2, but the example embodiments are not limited thereto. In other words, the beacon signal BS may be applied to the touch electrodes of the second section 312 in the first uplink period T1, and the beacon signal BS may also be applied to the touch electrodes of the second section 312 in the second uplink period T2. In this regard, by using the second section 312 as an overlap region during beacon-driving, a dead section between the beacon driving section BDS and the compensation section CPS may be removed.

Figure 10:
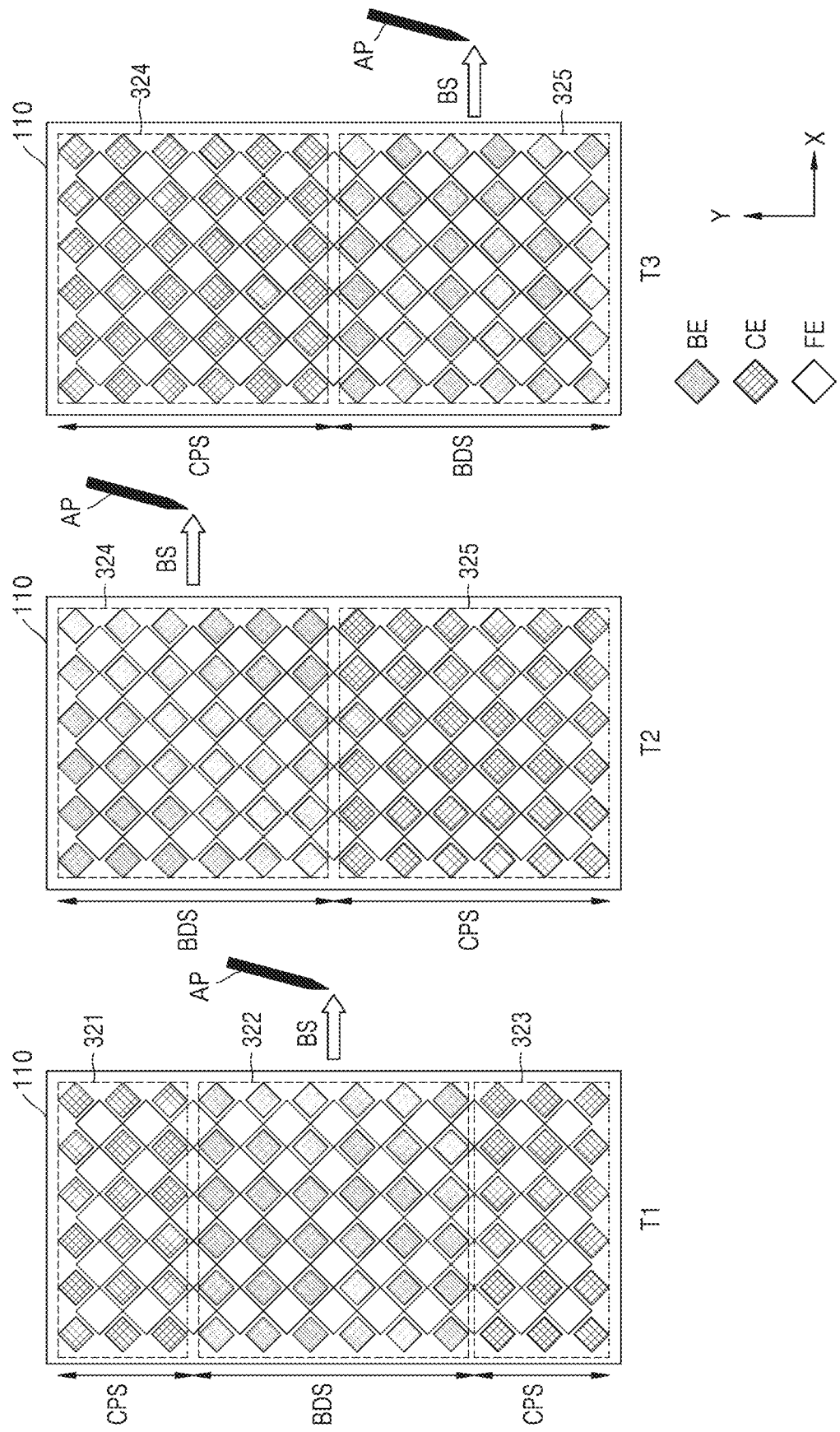

FIG. 10 is a diagram showing a method of driving the touch panel 110 in a discovery mode according to at least one example embodiment of the inventive concepts.

Referring to FIG. 10, the touch panel 110 may include a touch sensor array including a plurality of rows and a plurality of columns, the touch sensor array may be divided into a plurality of sections, and the sections may be changed according to time periods (and/or different time periods). For example, in the first uplink period T1, the rows in the touch sensor array may be divided into first to third sections 321, 322, and 323, and, in a second uplink period T2 and a third uplink period T3, the rows in the touch sensor array may be divided into a first section 324 and a second section 325, but the example embodiments are not limited thereto.

As shown in FIG. 10, in a first uplink period T1, at least one beacon signal BS may be transmitted to the active pen AP through the touch panel 110. In a second uplink period T2 after the first uplink period T1, at least one beacon signal BS may be transmitted to the active pen AP through the touch panel 110. In the third uplink period T3 after the second uplink period T2, at least one beacon signal BS may be transmitted to the active pen AP through the touch panel 110.

In the first uplink period T1, the first section 321 and the third section 323 may correspond to the compensation section CPS, and the second section 322 may correspond to the beacon driving section BDS, but the example embodiments are not limited thereto. The second section 322 corresponding to the beacon driving section BDS may include a plurality of touch electrodes to which the beacon signal BS is applied, e.g., beacon driving electrodes BE. The first section 321 and the third section 323 corresponding to the compensation section CPS may include a plurality of touch electrodes to which the compensation signal CS is applied, e.g., compensation driving electrodes CE. For example, in the first uplink period T1, a plurality of touch electrodes arranged in the second direction (e.g., the Y direction) may be floated, but the example embodiments of the inventive concepts are not limited thereto.

In the second uplink period T2, the first section 324 may correspond to the beacon driving section BDS, and the second section 325 may correspond to the compensation section CPS, but the example embodiments are not limited thereto. The first section 324 corresponding to the beacon driving section BDS may include a plurality of touch electrodes to which the beacon signal BS is applied, e.g., beacon driving electrodes BE. The second section 325 corresponding to the compensation section CPS may include a plurality of touch electrodes to which the compensation signal CS is applied, e.g., compensation driving electrodes CE. For example, in the second uplink period T2, a plurality of touch electrodes arranged in the second direction (e.g., the Y direction) may be floated, but the example embodiments of the inventive concepts are not limited thereto.

In the third uplink period T3, the first section 324 may correspond to the compensation section CPS, and the second section 325 may correspond to the beacon driving section BDS, but the example embodiments are not limited thereto. The first section 324 corresponding to the compensation section CPS may include a plurality of touch electrodes to which the compensation signal CS is applied, e.g., compensation driving electrodes CE. The second section 325 corresponding to the beacon driving section BDS may include a plurality of touch electrodes to which the beacon signal BS is applied, e.g., beacon driving electrodes BE. For example, in the third uplink period T3, a plurality of touch electrodes arranged in the second direction (e.g., the Y direction) may be floated, but the example embodiments of the inventive concepts are not limited thereto.

According to at least one example embodiment, in the second uplink period T2 and the third uplink period T3, the beacon driving section BDS and the compensation section CPS may be inverted, but are not limited thereto. In this situation, through frame inversion over time, at least one factor which causes a flicker phenomenon over time may be reduced and/or removed. Therefore, the flicker phenomenon in the display panel 120 may be further reduced.

Figure 11:
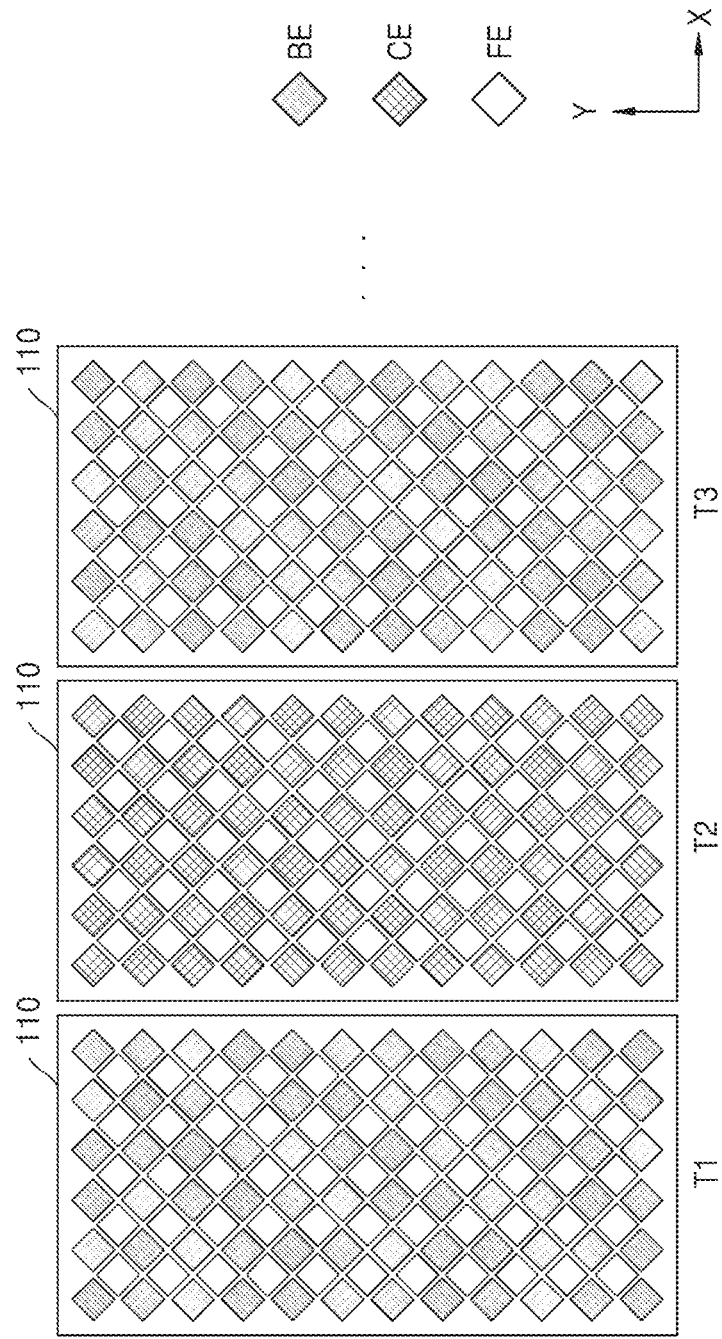

FIG. 11 is a diagram showing a method of driving the touch panel 110 in a discovery mode according to at least one example embodiment of the inventive concepts.

Referring to FIG. 11, according to at least one example embodiment, the touch panel 110 may include a plurality of touch electrodes, and a driving method of the touch electrodes may be changed over time. For example, in the first uplink period T1, a beacon signal BS may be applied to a plurality of touch electrodes connected to driving channels extending in the first direction (e.g., the X direction), and a plurality of touch electrodes connected to driving channels extending in the second direction (e.g., the Y direction) may be floated, etc. In the second uplink period T2, a compensation signal CS may be applied to the touch electrodes connected to the driving channels extending in the first direction (e.g., the X direction), and the touch electrodes connected to the driving channels extending in the second direction (e.g., the Y direction) may be floated, etc. In the third uplink period T3, a beacon signal BS may be applied to the touch electrodes connected to the driving channels extending in the first direction (e.g., the X direction), and the touch electrodes connected to the driving channels extending in the second direction (e.g., the Y direction) may be floated, etc.

According to at least one example embodiment, in the first to third uplink periods T1 to T3, a beacon signal and a compensation signal may be alternately applied to the touch electrodes, but the example embodiments are not limited thereto. In this regarding, through frame inversion over time, at least one factor which causes a flicker phenomenon over time may be reduced and/or removed. Therefore, the flicker phenomenon in the display panel 120 may be further reduced.

Figure 12:
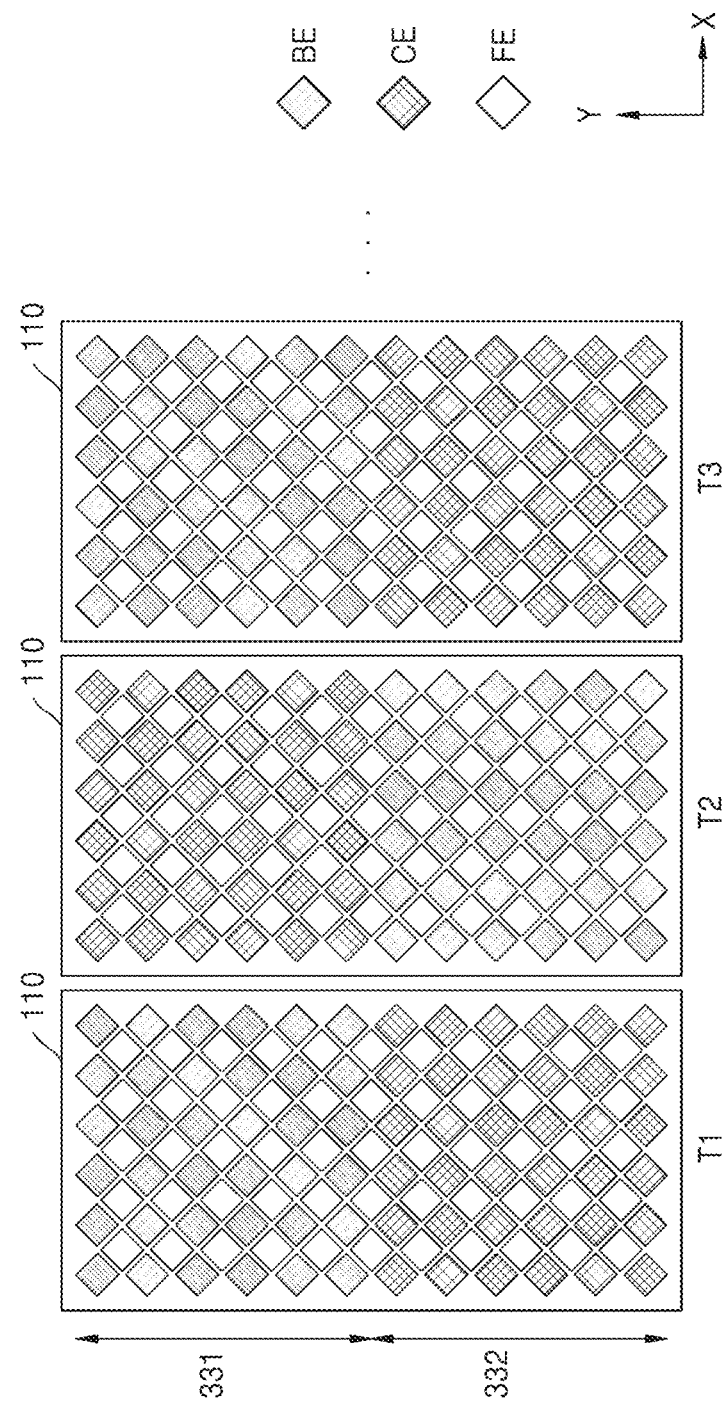

FIG. 12 is a diagram showing a method of driving the touch panel 110 in a discovery mode according to at least one example embodiment of the inventive concepts.

Referring to FIG. 12, the touch panel 110 may be divided into a first section 331 and a second section 332 adjacent to each other in the second direction (e.g., the Y direction), but the example embodiments are not limited thereto. For example, the touch panel 110 may include a touch sensor array including a plurality of rows and a plurality of columns, and the rows may be divided into the first section 331 and the second section 332. For example, touch electrodes corresponding to the columns included in the touch panel 110 may be floated, but the example embodiments of the inventive concepts are not limited thereto.

In the first uplink period T1, at least one beacon signal may be applied to touch electrodes corresponding to the rows included in the first section 331 to beacon-drive (e.g., drive using the beacon signal) the touch electrodes, and at least one compensation signal may be applied to touch electrodes corresponding to the rows included in the second section 332 to compensation-drive (e.g., drive using the compensation signal) the touch electrodes. In the second uplink period T2, at least one compensation signal may be applied to the touch electrodes corresponding to the rows included in the first section 331 to compensation-drive the touch electrodes, and at least one beacon signal may be applied to the touch electrodes corresponding to the rows included in the second section 332 to beacon-drive the touch electrodes. In the third uplink period T3, at least one beacon signal may be applied to the touch electrodes corresponding to the rows included in the first section 331 to beacon-drive the touch electrodes, and at least one compensation signal may be applied to the touch electrodes corresponding to the rows included in the second section 332 to compensation-drive the touch electrodes.

Figure 13:
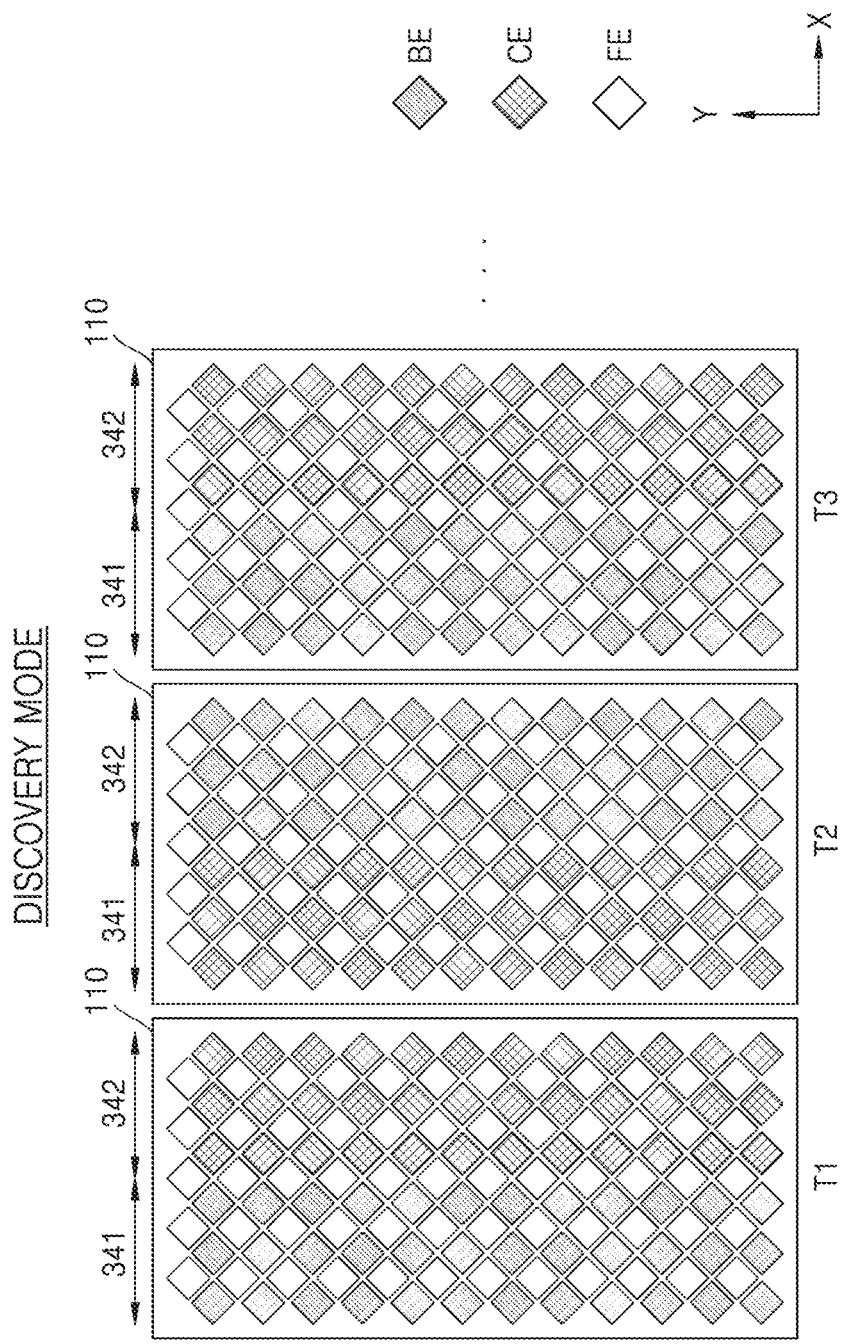

FIG. 13 is a diagram showing a method of driving the touch panel 110 in a discovery mode according to at least one example embodiment of the inventive concepts.

Referring to FIG. 13, the touch panel 110 may be divided into a first section 341 and a second section 342 adjacent to each other in the first direction (e.g., the X direction), but the example embodiments are not limited thereto. For example, the touch panel 110 may include a touch sensor array including a plurality of rows and a plurality of columns, and the columns may be divided into the first section 341 and the second section 342, etc. For example, touch electrodes corresponding to the rows included in the touch panel 110 may be floated, but the example embodiments of the inventive concepts are not limited thereto.

In the first uplink period T1, at least one beacon signal may be applied to touch electrodes corresponding to the columns included in the first section 341 to beacon-drive the touch electrodes, and at least one compensation signal may be applied to touch electrodes corresponding to the columns included in the second section 342 to compensation-drive the touch electrodes. In the second uplink period T2, at least one compensation signal may be applied to the touch electrodes corresponding to the columns included in the first section 341 to compensation-drive the touch electrodes, and at least one beacon signal may be applied to the touch electrodes corresponding to the columns included in the second section 342 to beacon-drive the touch electrodes. In the third uplink period T3, at least one beacon signal may be applied to the touch electrodes corresponding to the columns included in the first section 341 to beacon-drive the touch electrodes, and at least one compensation signal may be applied to the touch electrodes corresponding to the columns included in the second section 342 to compensation-drive the touch electrodes.

Figure 14:
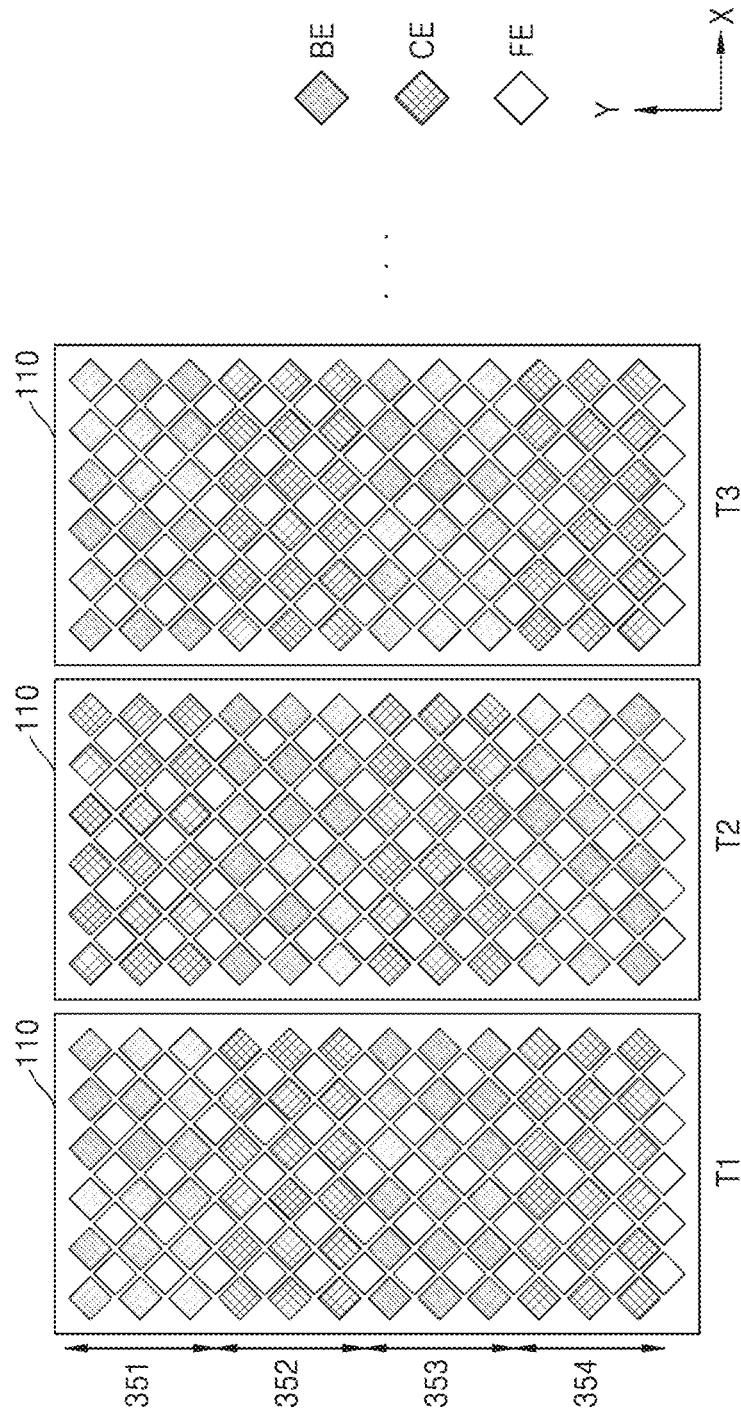

FIG. 14 is a diagram showing a method of driving the touch panel 110 in a discovery mode according to at least one example embodiment of the inventive concepts.

Referring to FIG. 14, the touch panel 110 may be divided into first to fourth sections 351, 352, 353, and 354 adjacent to one another in the second direction (e.g., the Y direction), but the example embodiments are not limited thereto. For example, the touch panel 110 may include a touch sensor array including a plurality of rows and a plurality of columns, and the rows may be divided into the first to fourth sections 351, 352, 353, and 354, etc. For example, touch electrodes corresponding to the columns included in the touch panel 110 may be floated, but the example embodiments of the inventive concepts are not limited thereto.

In the first uplink period T1, at least one beacon signal may be applied to touch electrodes corresponding to the rows included in the first section 351 and the third section 353 to beacon-drive the touch electrodes, and at least one compensation signal may be applied to touch electrodes corresponding to the rows included in the second section 352 and the fourth section 354 to compensation-drive the touch electrodes. In the second uplink period T2, at least one compensation signal may be applied to the touch electrodes corresponding to the rows included in the first section 351 and the third section 353 to compensation-drive the touch electrodes, and at least one beacon signal may be applied to the touch electrodes corresponding to the rows included in the second section 352 and the fourth section 354 to beacon-drive the touch electrodes. In the third uplink period T3, at least one beacon signal may be applied to the touch electrodes corresponding to the rows included in the first section 351 and the third section 353 to beacon-drive the touch electrodes, and at least one compensation signal may be applied to the touch electrodes corresponding to the rows included in the second section 352 and the fourth section 354 to compensation-drive the touch electrodes.

Figure 15:
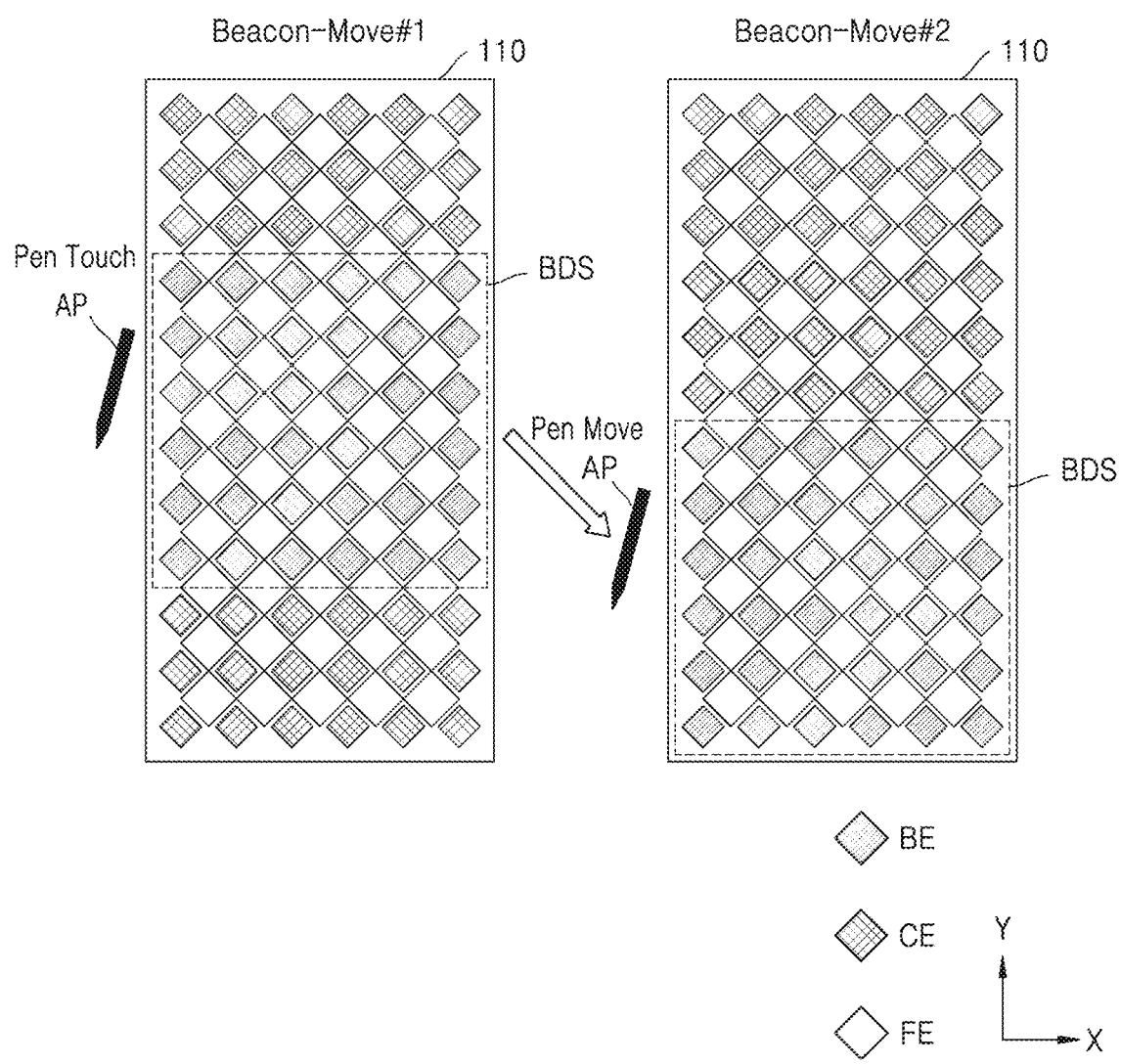
FIG. 15 is a diagram showing a method of driving a touch panel in a paring mode according to at least one example embodiment of the inventive concepts.

FIG. 15 is a diagram showing a method of driving the touch panel 110 in a paring mode according to at least one example embodiment of the inventive concepts.

Referring to FIG. 15, the location of the active pen AP may be changed due to a movement of the active pen AP while in the pairing mode. For example, the active pen AP may move from a middle region of the touch panel 110 to a lower region thereof, etc. Therefore, in the first uplink period T1, the beacon driving section BDS to which a first beacon signal is applied may correspond to the middle region of the touch panel 110, and, in the second uplink period T2, the beacon driving section BDS to which a second beacon signal is applied may be changed to the lower region of the touch panel 110. In the first uplink period T1 and the second uplink period T2, one or more compensation signals may be provided to touch electrodes arranged in a section other than the beacon driving section BDS, etc.

Figure 16:
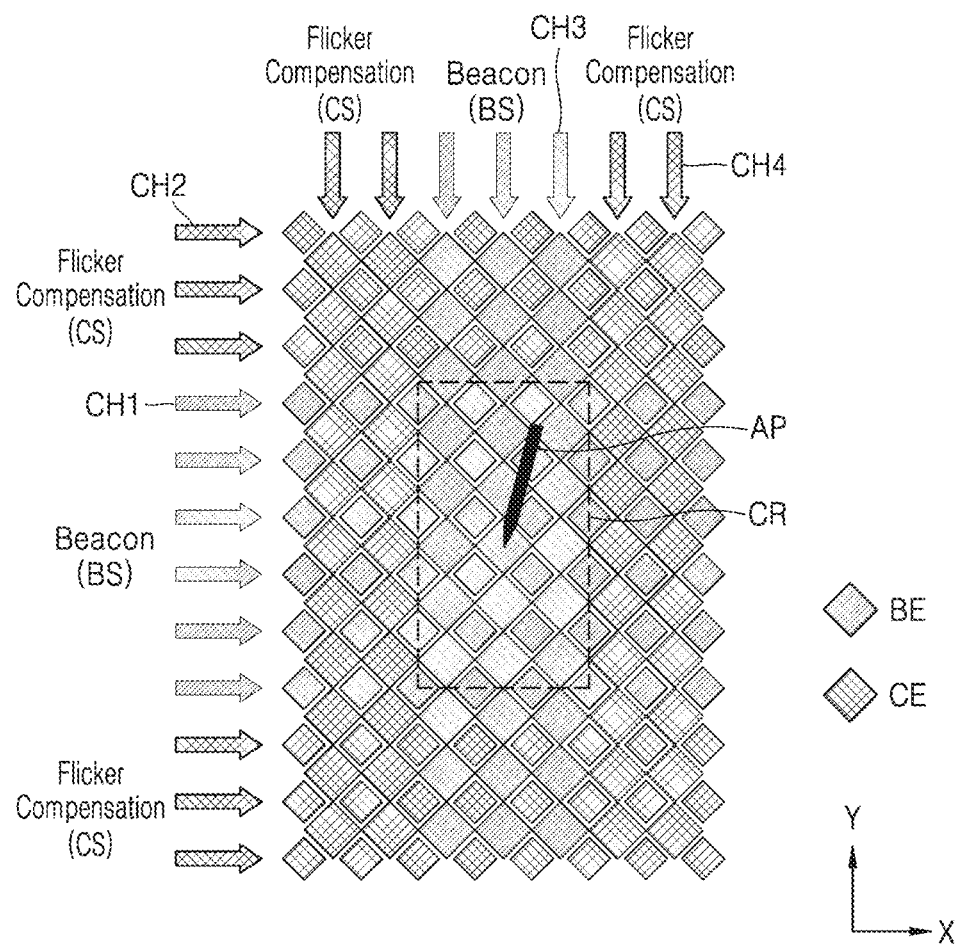
FIG. 16 is a diagram showing a method of driving a touch panel in a hover mode and/or an ink mode according to at least one example embodiment of the inventive concepts.

FIG. 16 is a diagram showing a method of driving the touch panel 110 in a hover mode and/or an ink mode according to at least one example embodiment of the inventive concepts.

Referring to FIG. 16, the active pen AP may be located in a center region CR of the touch panel 110, but is not limited thereto. In the hover mode and/or the ink mode, at least one beacon signal BS may be applied to all touch electrodes included in the center region CR thereof, but the example embodiments are not limited thereto. According to at least one example embodiment, a first driving channel CH1 and a second driving channel CH2 may extend in the first direction (e.g., the X direction) and may be parallel to each other in the second direction (e.g., the Y direction), whereas a third driving channel CH3 and a fourth driving channel CH4 may extend in the second direction (e.g., the Y direction) and may be parallel to each other in the first direction (e.g., the X direction), however, the example embodiments are not limited thereto. In at least one example embodiment, at least one beacon signal BS may be applied to the first driving channel CH1 and the third driving channel CH3, and at least one compensation signal CS may be applied to the second driving channel CH2 and the fourth driving channel CH4, etc.

Figure 17:
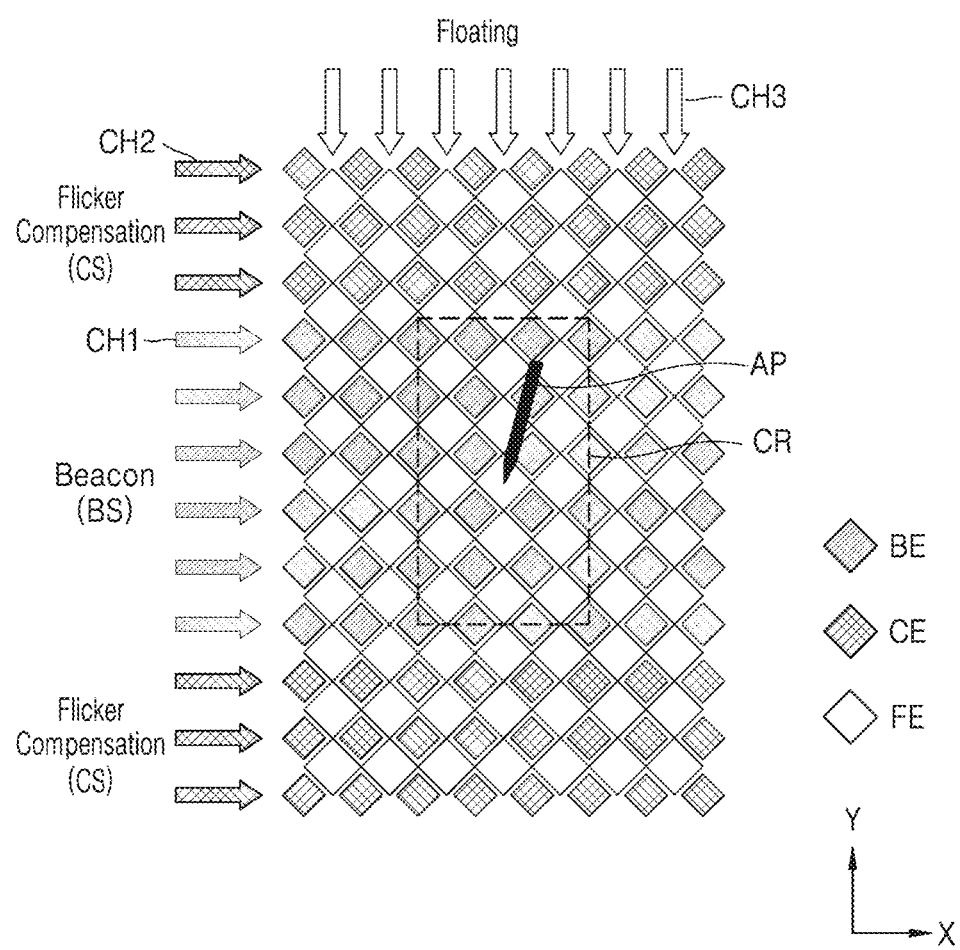
FIG. 17 is a diagram showing a method of driving a touch panel in a hover mode and/or an ink mode according to at least one example embodiment of the inventive concepts.

FIG. 17 is a diagram showing a method of driving the touch panel 110 in a hover mode and/or an ink mode according to at least one example embodiment of the inventive concepts.

Referring to FIG. 17, the active pen AP may be in the center region CR of the touch panel 110, but is not limited thereto. In the hover mode and/or the ink mode, a beacon signal BS may be applied to some of touch electrodes included in the center region CR thereof, etc. According to at least one example embodiment, first driving channels CH1 and second driving channels CH2 may extend in the first direction (e.g., the X direction) and may be parallel to each other in the second direction (e.g., the Y direction), whereas third driving channels CH3 may extend in the second direction (e.g., the Y direction) and may be parallel to each other in the first direction (e.g., the X direction), but the example embodiments are not limited thereto. In at least one example embodiment, at least one beacon signal BS may be applied to the first driving channels CH1, at least one compensation signal CS may be applied to the second driving channels CH2, and the third driving channels CH3 may be floated, etc.

Figure 18:
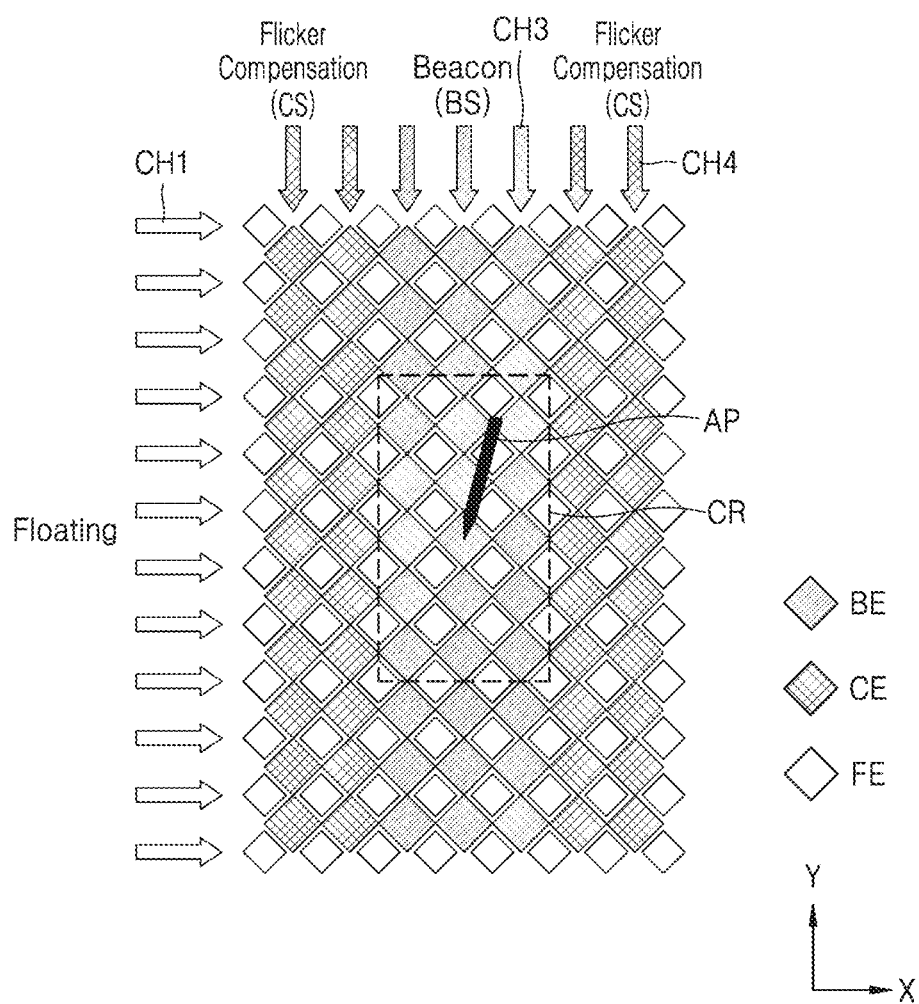
FIG. 18 is a diagram showing a method of driving a touch panel in a hover mode and/or an ink mode according to at least one example embodiment of the inventive concepts.

FIG. 18 is a diagram showing a method of driving the touch panel 110 in a hover mode and/or an ink mode according to at least one example embodiment of the inventive concepts.

Referring to FIG. 18, the active pen AP may be in the center region CR of the touch panel 110. In the hover mode and/or the ink mode, at least one beacon signal BS may be applied to some of touch electrodes included in the center region CR thereof, but the example embodiments are not limited thereto. In detail, the first driving channels CH1 may extend in the first direction (e.g., the X direction) and may be parallel to each other in the second direction (e.g., the Y direction), whereas the third driving channels CH3 and fourth driving channels CH4 may extend in the second direction (e.g., the Y direction) and may be parallel to each other in the first direction (e.g., the X direction), but are not limited thereto. In at least one example embodiment, at least one beacon signal BS may be applied to the third driving channels CH3, at least one compensation signal CS may be applied to the fourth driving channels CH4, and the first driving channels CH1 may be floated, etc.

Figure 19:
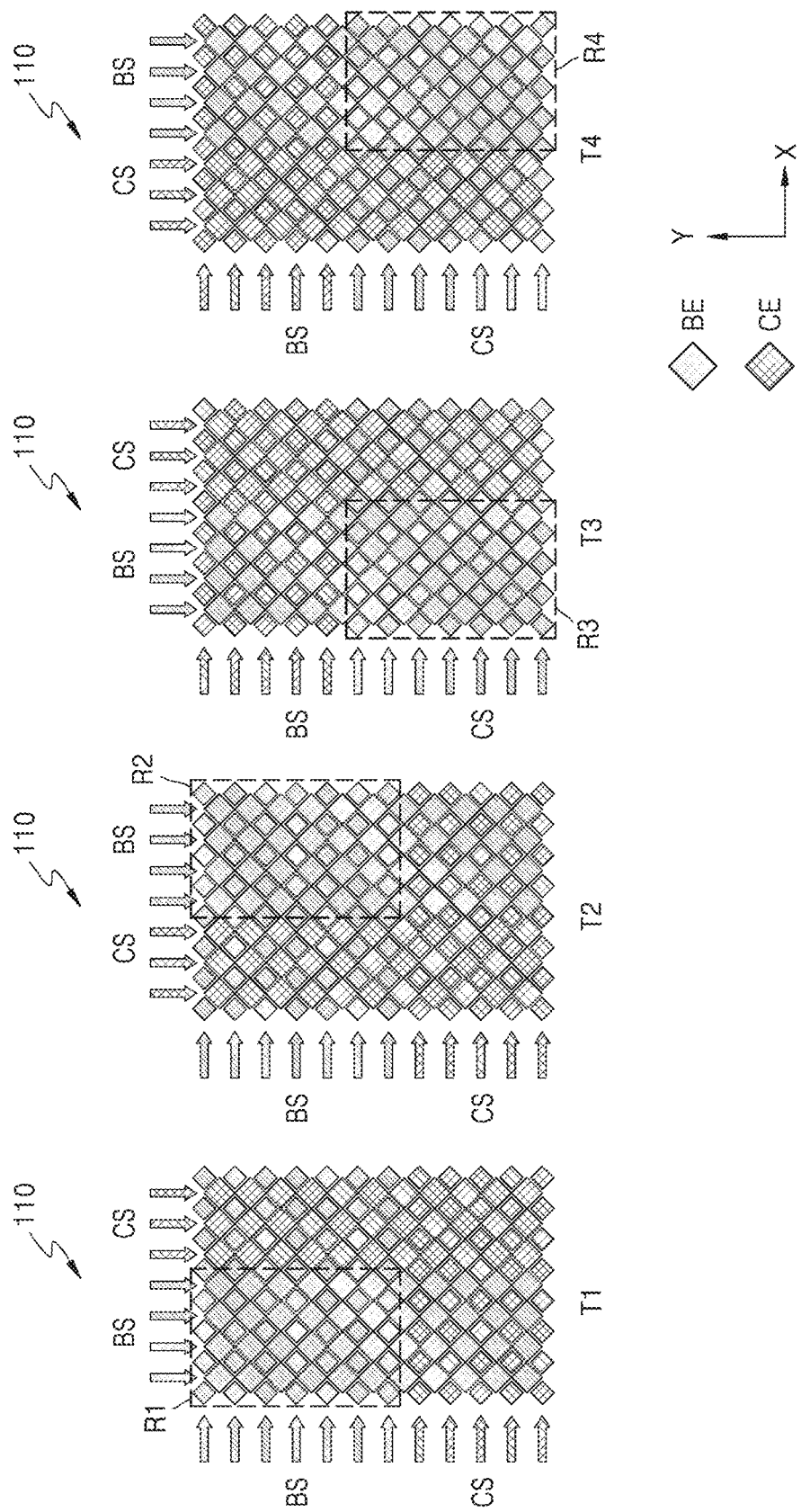
FIGS. 19 and 20 are diagrams showing methods of driving a touch panel according to some example embodiments of the inventive concepts, respectively.

FIG. 19 is a diagram showing a method of driving the touch panel 110 according to at least one example embodiment of the inventive concepts.

Referring to FIG. 19, the touch panel 110 may be driven by using an "all channel driving method" in which at least one driving signal is applied to all channels connected to the touch panel 110, but the example embodiments are not limited thereto. Specifically, according to the all-channel driving method, a driving signal may be applied to both row channels extending in the first direction (e.g., the X direction) and column channels extending in the second direction (e.g., the Y direction). At this time, at least one beacon signal BS may be applied to some row channels and some column channels, and at least one compensation signal CS may be applied to the remaining row channels and the remaining column channels. For example, the row channels may correspond to first channels and second channels (e.g., CH1 and CH2 of FIG. 18), respectively, and the column channels may correspond to third channels and fourth channels (e.g., CH3 and CH4 of FIG. 18), respectively, but the example embodiments are not limited thereto.

For example, in the first uplink period T1 of a first frame, a beacon signal BS may be applied to row channels and column channels corresponding to a first region R1, and a compensation signal CS may be applied to the remaining row channels and the remaining column channels, etc. Subsequently, in the second uplink period T2 of a second frame, a beacon signal BS may be applied to row channels and column channels corresponding to a second region R2, and a compensation signal CS may be applied to the remaining row channels and the remaining column channels, etc. Subsequently, in the third uplink period T3 of a third frame, a beacon signal BS may be applied to row channels and column channels corresponding to a third region R3, and a compensation signal CS may be applied to the remaining row channels and the remaining column channels, etc. Subsequently, in the fourth uplink period T4 of a fourth frame, a beacon signal BS may be applied to row channels and column channels corresponding to a fourth region R4, and a compensation signal CS may be applied to the remaining row channels and the remaining column channels, etc. In this regard, the touch panel 110 may be divided into four regions and one region may be uplink beacon-driven per frame, but the example embodiments are not limited thereto. According to at least one example embodiment, in each uplink period, a row channel and a column channel adjacent to a corresponding region may be determined as overlap lines and a beacon signal BS may be applied thereto.

Figure 20:
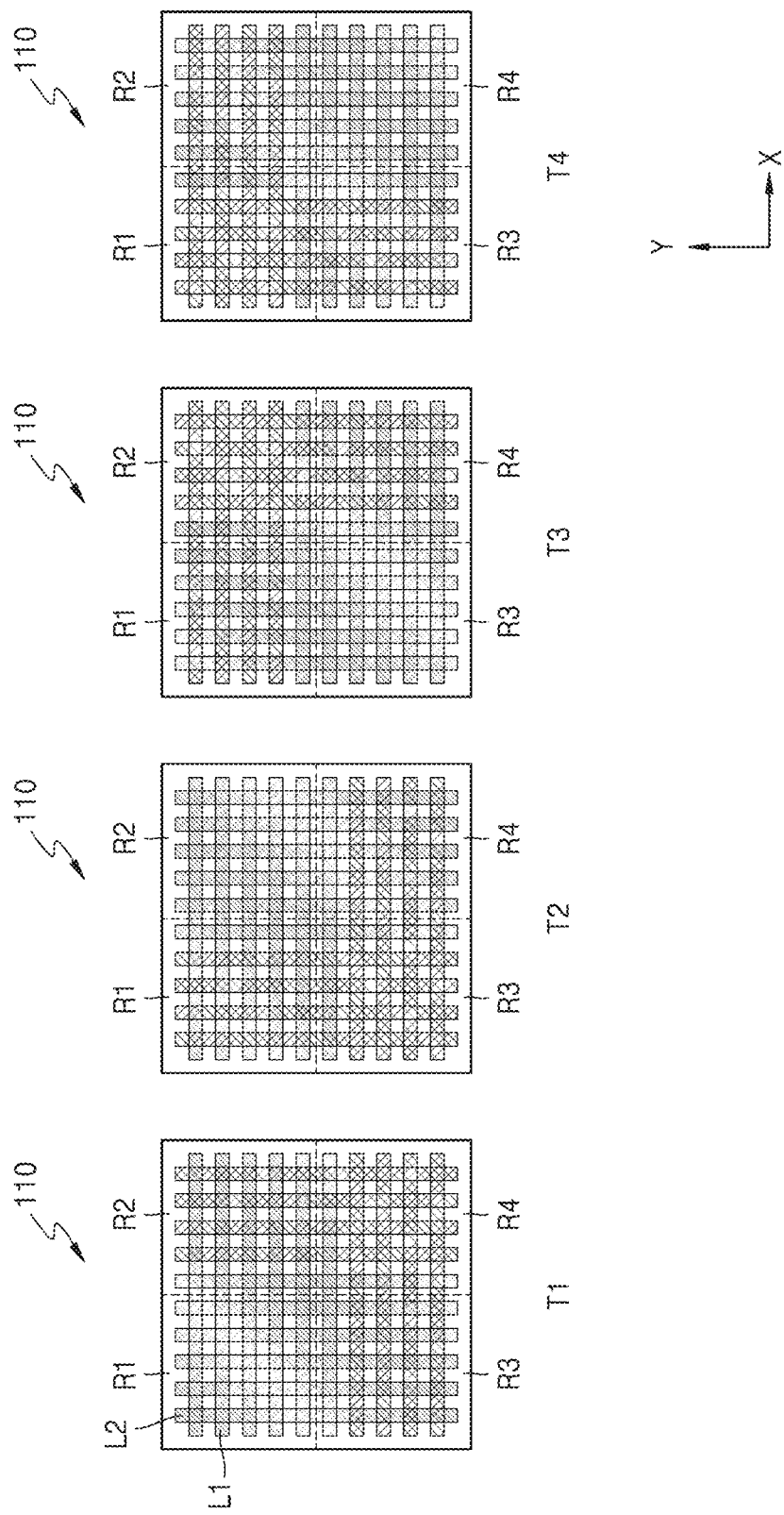

FIG. 20 is a diagram showing a method of driving the touch panel 110 according to at least one example embodiment of the inventive concepts.

Referring to FIG. 20, the touch panel 110 may be driven by using an "all channel driving method" in which at least one driving signal is applied to all channels connected to the touch panel 110. The touch panel 110 may be divided into first to fourth regions R1 to R4, and one region may be uplink beacon-driven per frame, but the example embodiments are not limited thereto. According to at least one example embodiment, the touch panel 110 may include row lines L1 extending in the first direction (e.g., the X direction) and column lines L2 extending in the second direction (e.g., the Y direction). The row lines L1 may correspond to rows of touch electrodes (and/or driving electrodes), respectively, and, for example, may be connected to first driving channels and second driving channels (e.g., CH1 and CH2 of FIG. 18), respectively, but the example embodiments are not limited thereto. The column lines L2 may correspond to columns of touch electrodes (and/or driving electrodes), respectively, and, for example, may be connected to third driving channels and fourth driving channels (e.g., CH3 and CH4 of FIG. 18), respectively, but the example embodiments are not limited thereto.

For example, in the first uplink period T1 of the first frame, at least one beacon signal BS may be applied to both the row lines L1 and the column lines L2 on the first region R1, and at least one compensation signal CS may be applied to column lines L2 on the second region R2 and the fourth region R4 and the row lines L1 on the third region R3 and the fourth region R4, but the example embodiments are not limited thereto. At this time, at least one beacon signal BS may be applied to at least one column line adjacent to the first region R1 in the second region R2 and at least one row line adjacent to the first region R1 in the third region R3, etc.

Subsequently, in the second uplink period T2 of the second frame, at least one beacon signal BS may be applied to both the row lines L1 and the column lines L2 on the second region R2, and at least one compensation signal CS may be applied to column lines L2 on the first region R1 and the third region R3 and the row lines L1 on the third region R3 and the fourth region R4, but the example embodiments are not limited thereto. At this time, at least one beacon signal BS may be applied to at least one column line adjacent to the second region R2 in the first region R1 and at least one row line adjacent to the second region R2 in the fourth region R4, etc.

Subsequently, in the third uplink period T3 of the third frame, at least one beacon signal BS may be applied to both the row lines L1 and the column lines L2 on the third region R3, and at least one compensation signal CS may be applied to column lines L2 on the second region R2 and the fourth region R4 and the row lines L1 on the first region R1 and the second region R2, but the example embodiments are not limited thereto. At this time, at least one beacon signal BS may be applied to at least one column line adjacent to the third region R3 in the first region R1 and at least one row line adjacent to the third region R3 in the fourth region R4, etc.

Subsequently, in the fourth uplink period T4 of the fourth frame, at least one beacon signal BS may be applied to both the row lines L1 and the column lines L2 on the fourth region R4, and at least one compensation signal CS may be applied to column lines L2 on the first region R1 and the third region R3 and the row lines L1 on the first region R1 and the second region R2, but the example embodiments are not limited thereto. At this time, at least one beacon signal BS may be applied to at least one column line adjacent to the fourth region R4 in the third region R3 and at least one row line adjacent to the fourth region R4 in the second region R2, etc.

In this regard, a plurality of regions of the touch panel 110 may be individually driven by using the all-channel driving method. Although FIGS. 19 and 20 show that the touch panel 110 is divided into four regions, the example embodiments of the inventive concepts are not limited thereto, and the number of regions of the touch panel 110 may vary. Here, the number of lines to which the beacon signal BS is applied and/or the number of lines to which the compensation signal CS is applied may be substantially similar to each other, and the driving method may be referred to as an "all-channel balanced driving method," but the example embodiments are not limited thereto. According to the all-channel balanced driving method, a flicker phenomenon in the display panel under the touch panel 110 may be reduced.

Figure 21:
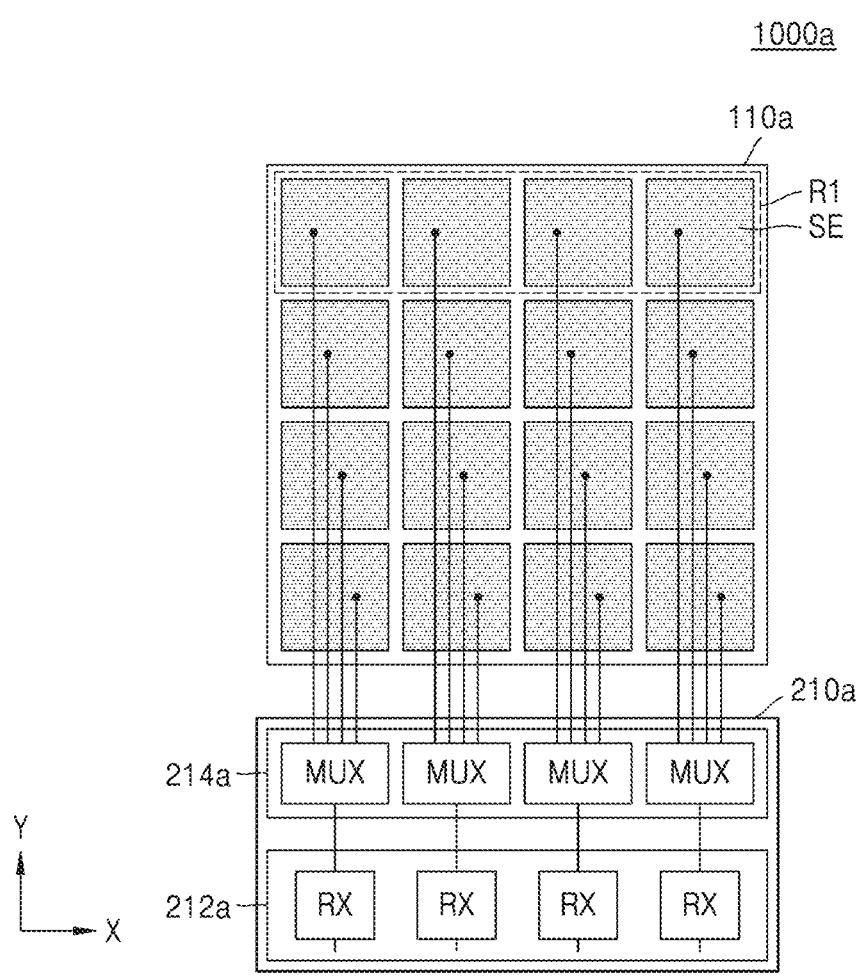
FIG. 21 is a diagram showing a touchscreen device according to at least one example embodiment of the inventive concepts.

FIG. 21 is a diagram showing a touchscreen device 1000a according to at least one example embodiment of the inventive concepts.

Referring to FIG. 21, the touchscreen device 1000a may include a touch panel 110a and/or a touch controller 210a, etc., but is not limited thereto. The touch panel 110a may include a plurality of sensing electrodes SE (e.g., "dot sensors") arranged in rows and columns. Here, the touch panel 110a may be sense a touch according to a self-capacitance scheme, but the example embodiments are not limited thereto.

In at least one example embodiment, the touch controller 210a may include a receiving circuit 212a and/or a selecting circuit 214a, etc., but is not limited thereto. The receiving circuit 212a may include a plurality of receivers RX, and the selecting circuit 214a may include a plurality of selectors, e.g., multiplexers MUX, etc., but are not limited thereto. The receivers RX may each operate as both a transmitter (e.g., the transmitter TX of FIG. 2) and a receiver, but is not limited thereto. The sensing electrodes SE in the same column may be connected to the same multiplexer MUX, and a sensing electrode SE selected by the multiplexer MUX may be electrically connected to the receiver RX, but the example embodiments are not limited thereto. At least one driving signal may be applied to the sensing electrode SE selected by the multiplexer MUX through the receiver RX, and at least one sensing signal generated based on the at least one driving signal may be output to the receiver RX, etc. For example, the driving signal may correspond to a beacon signal or a compensation signal. Although not shown, the touch controller 210*a* may further include an encoder, a decoder, and/or a touch processor, etc. The descriptions given above with reference to FIG. 2 may be applied to the operations of the encoder, the decoder, and the touch processor, but the example embodiments are not limited thereto.

Figure 22:
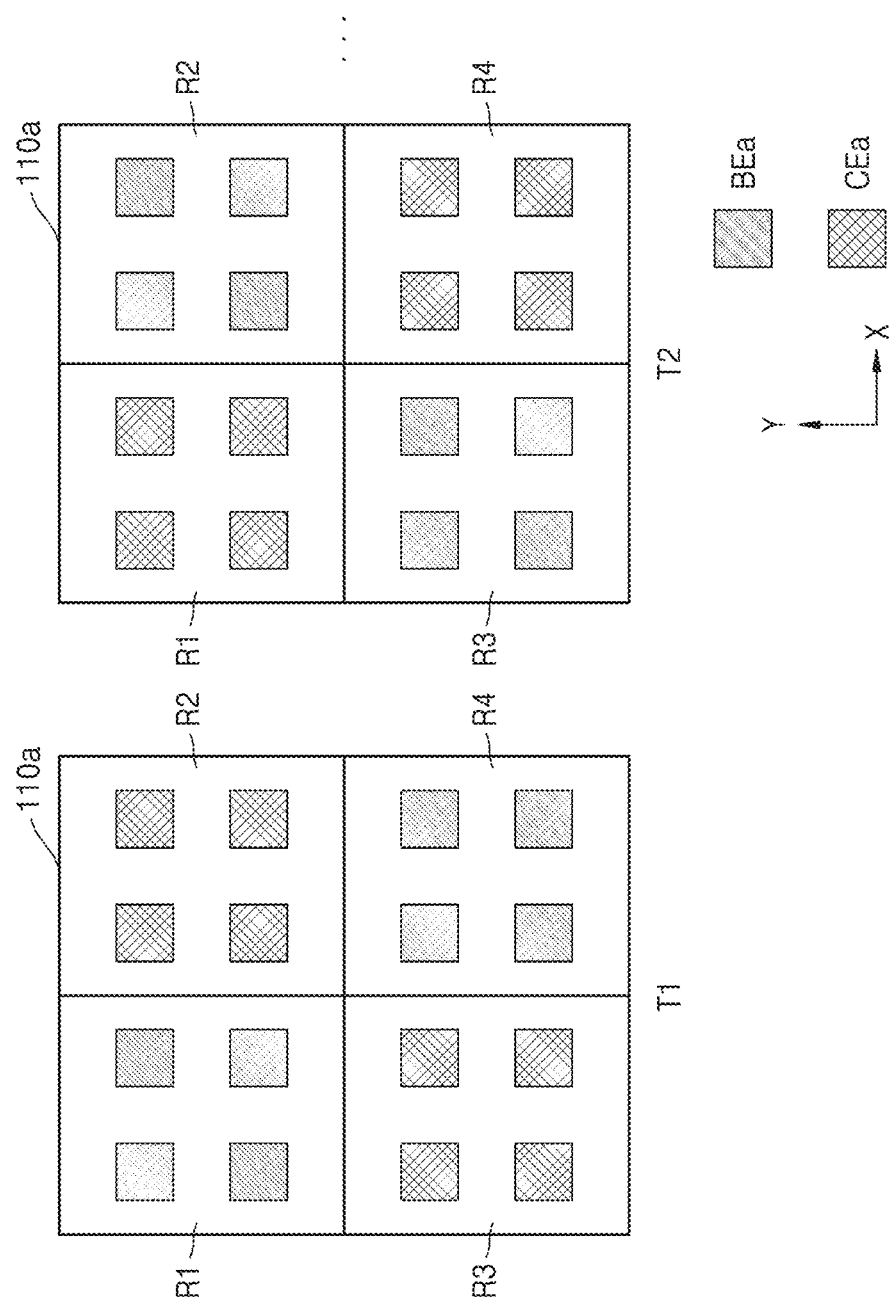
FIG. 22 is a diagram showing a method of driving a touch panel according to at least one example embodiment of the inventive concepts.

FIG. 22 is a diagram showing a method of driving the touch panel 110*a* according to at least one example embodiment of the inventive concepts.

Referring to FIG. 22, the touch panel 110*a* may be divided into a plurality of regions, e.g., first to fourth regions R1 to R4, etc., but is not limited thereto. In the first uplink period T1, a beacon signal may be applied to dot sensors arranged in the first region R1 and the fourth region R4, and a compensation signal may be applied to dot sensors arranged in the second region R2 and the third region R3, etc. Therefore, the dot sensors arranged in the first region R1 and the fourth region R4 may beacon-driven, whereas the dot sensors arranged in the second region R2 and the third region R3 may be compensation-driven, but are not limited thereto. In the second uplink period T2, a compensation signal may be applied to the dot sensors arranged in the first region R1 and the fourth region R4, and a beacon signal may be applied to the dot sensors arranged in the second region R2 and the third region R3, etc. Therefore, the dot sensors arranged in the first region R1 and the fourth region R4 may compensation-driven, whereas the dot sensors arranged in the second region R2 and the third region R3 may be beacon-driven, but are not limited thereto.

Figure 23:
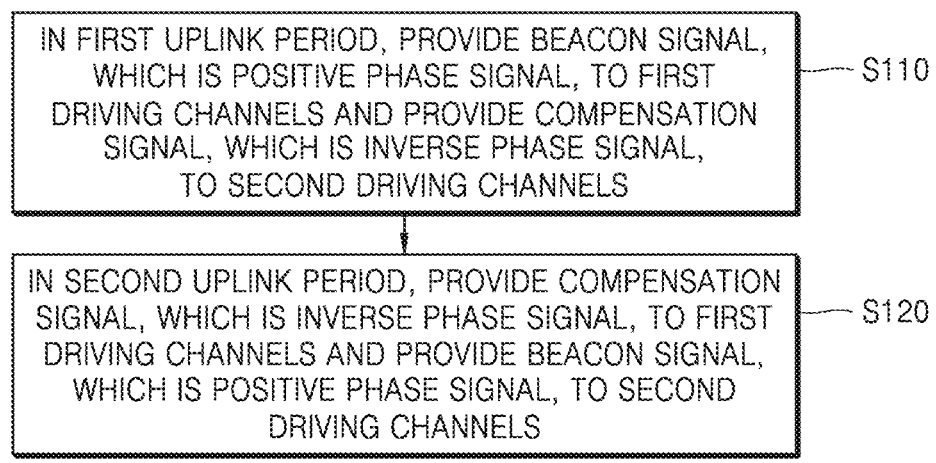
FIG. 23 is a flowchart of a method of operating a touch controller according to at least one example embodiment of the inventive concepts.

FIG. 23 is a flowchart of a method of operating a touch controller according to at least one example embodiment of the inventive concepts.

Referring to FIG. 23, a method of operating a touch controller is a method of driving a touchscreen including a touch sensor array, and may include, for example, operations performed in a time series by the touch controller 210 of FIG. 1, but the example embodiments are not limited thereto. The descriptions given above with reference to FIGS. 1 to 22 may also be applied to the at least one example embodiment of FIG. 23, and descriptions identical to those will be omitted. Hereinafter, descriptions will be given with reference to FIGS. 8, 9, and 24 together.

In operation S110, in a first uplink period for communication with an active pen, a beacon signal BS, which is a positive phase signal, is provided to first driving channels CH1 connected to the touch sensor array, and a compensation signal, which is an inverse phase signal of the beacon signal BS (e.g., a negative phase signal), is provided to second driving channels CH2 connected to the touch sensor array. Here, the beacon signal BS and the compensation signal CS have the same amplitude. Additionally, the first driving channels CH1 and the second driving channels CH2 may be parallel to each other, but are not limited thereto. The touchscreen 100 further includes a pixel array and a common electrode between the pixel array and the touch sensor array, and, by providing a compensation signal CS to the second driving channels CH2 in operation S110, noise charges introduced into the common electrode may be reduced and/or eliminated through a capacitive coupling between the touch sensor array and the common electrode.

In operation S120, in a second uplink period after the first uplink period, a compensation signal is provided to the first driving channels CH1 and a beacon signal is provided to the second driving channels CH2. For example, the number of first driving channels CH1 may be the same and/or substantially the same as the number of second driving channels CH2, but the example embodiments are not limited thereto.

In at least one example embodiment, operations S110 and S120 may correspond to a discovery mode between a touch controller and an active pen. In at least one example embodiment, the method of operating the touch controller may further include providing a beacon signal BS to a driving channel corresponding to the location of an active pen AP from among first driving channels CH1 and second driving channels CH2 according to a movement of the active pen AP in a pairing mode between the touch controller 210 and the active pen AP, but the example embodiments are not limited thereto.

In at least one example embodiment, the method of operating the touch controller may further include, in a hover mode and/or an ink mode between the touch controller 210 and the active pen AP, providing a compensation signal CS to the first driving channels CH1, providing a beacon signal BS to the second driving channels CH2, and providing a beacon signal BS to third driving channels (e.g., CH3 of FIG. 16) orthogonal and/or substantially orthogonal to the first driving channels CH1 and the second driving channels CH2, but the example embodiments are not limited thereto. In at least one example embodiment, the method of operating the touch controller may further include, in a hover mode and/or an ink mode between the touch controller 210 and the active pen AP, providing a compensation signal CS to the first driving channels CH1, providing a beacon signal BS to the second driving channels CH2, and floating the third driving channels (e.g., CH3 of FIG. 17) orthogonal and/or substantially orthogonal to the first driving channels CH1 and the second driving channels CH2, but the example embodiments are not limited thereto.

In at least one example embodiment, the method of operating the touch controller may further include, in a first uplink period, providing a beacon signal BS to the third driving channels CH3 connected to the touch sensor array and orthogonal and/or substantially orthogonal to the first driving channels CH1 and the second driving channels CH2 and providing a compensation signal to the fourth driving channels CH4 connected to the touch sensor array and orthogonal and/or substantially orthogonal to the first driving channels CH1 and the second driving channels CH2. Also, in at least one example embodiment, the method of operating the touch controller may further include, in a second uplink period, providing a compensation signal CS to the third driving channels CH3 and providing a beacon signal BS to the fourth driving channels CH4, but the example embodiments are not limited thereto.

FIG. 24 is a block diagram showing a touchscreen system 2000 according to at least one example embodiment of the inventive concepts.

Referring to FIG. 24, the touchscreen system 2000 may include the touch panel 110, the display panel 120, the touch controller 210, the display driving circuit 220, at least one processor 2100, a storage device 2200, an interface 2300, and/or a bus 2400, etc., but the example embodiments are not limited thereto. According to at least one example embodiment, the touch controller 210, the display driving circuit 220, the at least one processor 2100, the storage device 2200, the interface 2300, and/or the bus 2400, etc., of the touchscreen system 2000 may be processing circuitry, and the processing circuitry may include hardware, such as processors, processor cores, logic circuits, storage devices, etc.; a hardware/software combination such as at least one processor core executing software and/or executing any instruction set, etc.; or a combination thereof, but the example embodiments are not limited thereto. For example, the processing circuitry more specifically may include, but is not limited to, a field programmable gate array (FPGA), a programmable logic unit, an application-specific integrated circuit (ASIC), s System-on-Chip (SoC), etc. The touch panel 110 is configured to be capable of detecting a touch event occurring at each point. The display panel 120 may include various types of panels like an LED, an OLED, and/or an LCD, etc., configured to display images and/or videos, but the example embodiments are not limited thereto. The touch panel 110 and the display panel 120 may be integrally formed to overlap each other. The touch controller 210 may control the operation of the touch panel 110 and transmit an output of the touch panel 110 to the processor 2100.

The display driving circuit 220 controls the display panel 120 to display an image on the display panel 120. Although not shown, the display driving circuit 220 may include a source driver, a grayscale voltage generator, a gate driver, a timing controller, a power supply, and/or an in-image interface, etc. Image data to be displayed on the display panel 120 may be stored in a memory through an image interface and may be converted into an analog signal by using grayscale voltages generated by the gray voltage generator. The source driver and the gate driver may drive the display panel 120 in response to a vertical synchronization signal and/or a horizontal synchronization signal provided by the timing controller.

The processor 2100 may execute commands and may control the overall operation of the touchscreen system 2000. Program codes or data requested by the processor 2100 may be stored in the storage device 2200. The interface 2300 may communicate with any external device and/or system. The processor 2100 may include a coordinate mapper 2110, etc. A location on the touch panel 110 and a location on the display panel 120 may be mapped to each other, and the coordinate mapper 2210 may extract a corresponding coordinate of the display panel 120 corresponding to a touch point on the touch panel 110 at which a touch input occurred. Through the coordinate mapping between the touch panel 110 and the display panel 120, a user may perform input actions for selecting and controlling icons, menu items, and/or images displayed on the display panel 120, e.g., a touch action, a drag, a pinch, a stretch, a single and/or multi touch action, etc.

According to some example embodiments, the touchscreen system 2000 may be a smart home appliance having an image display function, but is not limited thereto. For example, smart home appliances may include at least one of a television, a digital video disk (DVD) player, a Blu-ray player, an audio device, a refrigerator, an air conditioner, a vacuum cleaner, an oven, a microwave, a washing machine, an air purifier, a set-top box, a TV box (e.g. Samsung HomeSync™, Apple TV™, or Google TV™), a game console, an electronic dictionary, an electronic key, a camcorder, and/or an electronic picture frame, etc., but the example embodiments are not limited thereto.

According to some example embodiments, the touchscreen system 2000 may include at least one of various medical devices (e.g., magnetic resonance angiography (MRA), magnetic resonance imaging (MRI), computed tomography (CT), an imager, an ultrasound device, etc.), a navigation device, a global positioning system (GPS) receiver, an event data recorder (EDR), a flight data recorder (FDR), an automobile infotainment device, marine electronic equipment (e.g. a marine navigation device, a gyro compass, etc.), an avionics, a security device, a vehicle head unit, an industrial and/or home robot, an automatic teller's machine (ATM) of a financial institution, and/or a point of sales (POS) of a store, etc.

According to some example embodiments, the touchscreen system 2000 may include at least one of a furniture and/or a part of a building/structure having an image display function, an electronic board, an electronic sign, an electronic signature receiving device, a projector, and/or various measuring devices (e.g., measuring devices for water, electricity, gas, and radio wave), etc. An electronic device including the touchscreen system 2000 according to various example embodiments of the inventive concepts may be a combination of one or more of the above-stated various devices. Also, the touchscreen system 2000 may be a flexible device. It would be obvious to one of ordinary skill in the art that the touchscreen system 2000 according to various example embodiments of the inventive concepts are not limited to the above-stated devices.

While the example embodiments of the inventive concepts has been particularly shown and described with reference to various example embodiments thereof, it will be understood that various changes in form and details may be made therein without departing from the spirit and scope of the following claims.

What is claimed is:

1. A touch sensing device comprising:
a touch sensor array including at least one beacon driving section and at least one compensation section, the at least one beacon driving section including a plurality of first touch electrodes, and the at least one compensation section including a plurality of second touch electrodes; and
a touch controller connected to the touch sensor array through at least one first driving channel and at least one second driving channel, and
the touch controller is configured to, during a first uplink period for communication with an active pen,
provide at least one beacon signal to the at least one first driving channel, and
provide at least one compensation signal to the at least one second driving channel, the at least one compensation signal being an inverse of the at least one beacon signal.

2. The touch sensing device of claim 1, further comprising:
a pixel array including a plurality of pixels; and
at least one common electrode located between the pixel array and the touch sensor array,
the touch controller is further configured to eliminate noise charges introduced into the at least one common electrode through a capacitive coupling between the touch sensor array and the at least one common electrode by providing the at least one beacon signal and the at least one compensation signal to the at least one first driving channel and the at least one second driving channel, respectively.

3. The touch sensing device of claim 1, wherein the at least one first driving channel includes a same number of channels as the at least one second driving channel.

4. The touch sensing device of claim 1, wherein, during a discovery mode between the touch sensing device and the active pen;

during a second uplink period, the touch controller is further configured to,
provide the at least one compensation signal to the at least one first driving channel; and
provide the at least one beacon signal to the at least one second driving channel.

5. The touch sensing device of claim 4, wherein,
the touch controller is connected to the touch sensor array through the at least one first driving channel, the at least one second driving channel, and at least one third driving channel located between the at least one first driving channel and the at least one second driving channel; and
the touch controller is further configured to provide the at least one beacon signal to the at least one third driving channel during the first uplink period and the second uplink period.

6. The touch sensing device of claim 1, wherein the at least one beacon signal and the at least one compensation signal have the same amplitude.

7. The touch sensing device of claim 1, wherein the at least one first driving channel and the at least one second driving channel are parallel to each other.

8. The touch sensing device of claim 1, wherein the at least one compensation section includes at least a first compensation section and a second compensation section, and
the at least one beacon driving section is located between the first compensation section and the second compensation section.

9. The touch sensing device of claim 1, wherein
the at least one compensation section includes at least a first compensation section and a second compensation section;
the at least one beacon driving section includes at least a first beacon driving section and a second beacon driving section; and
the first compensation section is located between the first beacon driving section and the second beacon driving section.

10. The touch sensing device of claim 1, wherein, during a pairing mode between the touch sensing device and the active pen,
the touch controller is further configured to change a location of the at least one beacon driving section based on movement of the active pen.

11. The touch sensing device of claim 1, wherein, during a hover mode and an ink mode between the touch sensing device and the active pen, the touch controller is further configured to:
provide the at least one beacon signal to a plurality of first touch sensors through the at least one first driving channel;
provide the at least one compensation signal to a plurality of second touch sensors through the at least one second driving channel;
provide the at least one beacon signal to a plurality of third touch sensors through at least one third driving channel orthogonal to the at least one first driving channel and the at least one second driving channel; and
provide the compensation signal to a plurality of fourth touch sensors through at least one fourth driving channel parallel to the at least one third driving channel.

12. The touch sensing device of claim 1, wherein, during a hover mode and an ink mode between the touch sensing device and the active pen, the touch controller is further configured to:
provide the at least one beacon signal to a plurality of first touch sensors through the at least one first driving channel,
provide the at least one compensation signal to a plurality of second touch sensors through the at least one second driving channel, and
float at least one third driving channels orthogonal to the at least one first driving channel and the at least one second driving channel.

13. The touch sensing device of claim 1, wherein
the touch controller is connected to the touch sensor array through the at least one first driving channel and the at least one second driving channel extending in a first direction and at least one third driving channel and at least one fourth driving channel extending in a second direction; and
during the first uplink period, the touch controller is further configured to provide the at least one beacon signal to the at least one first driving channel and the at least one third driving channel, and provide the at least one compensation signal to the at least one second driving channel and the at least one fourth driving channel.

14. The touch sensing device of claim 13, wherein the touch controller is further configured to:
provide the at least one beacon signal to the at least one first driving channel and the at least one fourth driving channel, and provide the at least one compensation signal to the at least one second driving channel and the at least one third driving channel during a second uplink period;
provide the at least one beacon signal to the at least one second driving channel and the at least one third driving channel, and provide the at least one compensation signal to the at least one first driving channel and the at least one fourth driving channel during a third uplink period; and
provide the at least one beacon signal to the at least one second driving channel and the at least one fourth driving channel, and provide the at least one compensation signal to the at least one first driving channel and the at least one third driving channel during a fourth uplink period.

15. The touch sensing device of claim 1, wherein
the touch sensor array includes a plurality of dot sensors;
the at least one beacon driving section includes at least a first beacon driving section and a second beacon driving section; and
the at least one compensation section includes,
a first compensation section adjacent to the first beacon driving section in a first direction, and
a second compensation section adjacent to the first beacon driving section in a second direction and adjacent to the second beacon driving section in the first direction.

16. A touch controller configured to drive a touch sensor array, the touch controller comprising:
a driving circuit including a plurality of transmitters respectively connected to a plurality of driving channels, the plurality of driving channels including at least one first driving channel and at least one second driving channel that are parallel to each other; and at least one touch processor configured to control the driving circuit to provide at least one beacon signal to the at least one first driving channel and at least one compensation signal to the at least one second driving channel during a first uplink period for communication between the touch controller and an active pen, the at least one compensation signal being an inverse of the at least one beacon signal, and the at least one beacon signal and the at least one compensation signal have the same amplitude.

17. The touch controller of claim 16, wherein, during a discovery mode between the touch controller and the active pen:
the at least one touch processor is further configured to, control the driving circuit to provide the at least one compensation signal to the at least one first driving channel, and
provide the at least one beacon signal to the at least one second driving channel during a second uplink period.

18. The touch controller of claim 17, wherein
the plurality of driving channels further include at least one third driving channel located between the at least one first driving channel and the at least one second driving channel; and
the touch controller is further configured to control the driving circuit to provide the at least one beacon signal to the at least one third driving channel during the first uplink period and the second uplink period.

19. The touch controller of claim 16, wherein
the plurality of driving channels further include at least one third driving channel and at least one fourth driving channel orthogonal to the at least one first driving channel and the at least one second driving channel; and during the first uplink period, the touch processor is further configured to,
provide the at least one beacon signal to the at least one first driving channel and the at least one third driving channel, and
provide the at least one compensation signal to the at least one second driving channel and the at least one fourth driving channel.

20. A method of operating a touch controller for driving a touchscreen, the touchscreen including a touch sensor array, the method comprising:
providing at least one beacon signal to at least one first driving channel connected to the touch sensor array during a first uplink period for communication with an active pen;
during the first uplink period, providing at least one compensation signal to at least one second driving channel connected to the touch sensor array, the at least one second driving channel parallel to the at least one first driving channel, the at least one compensation signal being inverse to the at least one beacon signal;
providing the at least one compensation signal to the at least one first driving channel during a second uplink period; and
providing the at least one beacon signal to the at least one second driving channel during the second uplink period, and
the at least one beacon signal and the at least one compensation signal have the same amplitude.

* * * * *